US008339664B2

(12) United States Patent
Yamazaki

(10) Patent No.: US 8,339,664 B2
(45) Date of Patent: Dec. 25, 2012

(54) IMAGE PROCESSING METHOD, IMAGE PROCESSING APPARATUS, AND CONTROL METHOD THEREOF

(75) Inventor: Masahito Yamazaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 883 days.

(21) Appl. No.: 12/437,230

(22) Filed: May 7, 2009

(65) Prior Publication Data

US 2009/0284771 A1 Nov. 19, 2009

(30) Foreign Application Priority Data

May 15, 2008 (JP) .................................. 2008-128794

(51) Int. Cl.
*G06K 15/02* (2006.01)

(52) U.S. Cl. .......... 358/1.9; 358/1.2; 358/1.16; 358/2.1; 382/165; 382/173

(58) Field of Classification Search .................... 358/1.1, 358/1.2, 1.9, 2.1, 1.13, 1.17, 1.18; 382/165, 382/173, 209, 228
See application file for complete search history.

(56) References Cited

U.S. PATENT DOCUMENTS

| | | | |
|---|---|---|---|
| 6,040,917 A * | 3/2000 | Campbell et al. ............. | 358/1.17 |
| 6,172,766 B1 | 1/2001 | Honma | |
| 6,483,519 B1 | 11/2002 | Long et al. ..................... | 345/619 |
| 6,738,517 B2 * | 5/2004 | Loce et al. ..................... | 382/209 |
| 6,828,985 B1 | 12/2004 | Long et al. ..................... | 345/620 |
| 7,046,253 B2 | 5/2006 | Long et al. ..................... | 345/591 |
| 7,817,307 B2 * | 10/2010 | Romney ........................ | 358/2.1 |
| 8,045,215 B2 * | 10/2011 | Jacobsen et al. ............... | 358/1.2 |
| 8,045,231 B1 * | 10/2011 | Romney ........................ | 358/2.1 |
| 2002/0076107 A1 * | 6/2002 | Loce et al. ..................... | 382/209 |
| 2004/0075849 A1 * | 4/2004 | Jacobsen et al. ............... | 358/1.2 |
| 2005/0024684 A1 * | 2/2005 | Rao et al. ....................... | 358/2.1 |
| 2008/0074685 A1 * | 3/2008 | Sakamoto ..................... | 358/1.9 |
| 2011/0128585 A1 * | 6/2011 | Romney ........................ | 358/1.17 |
| 2011/0235080 A1 * | 9/2011 | Satou et al. .................... | 358/1.13 |

FOREIGN PATENT DOCUMENTS

| | | |
|---|---|---|
| JP | 10-202960 | 8/1998 |
| JP | 10-264454 A | 10/1998 |
| JP | 11-066327 A | 3/1999 |
| JP | 2000-137825 | 5/2000 |
| JP | 2000-149035 | 5/2000 |
| JP | 2005-305873 A | 11/2005 |
| JP | 2006-103045 A | 4/2006 |
| JP | 2006-341386 A | 12/2006 |

\* cited by examiner

*Primary Examiner* — Kimberly A Williams
(74) *Attorney, Agent, or Firm* — Fitzpatrick, Cella, Harper & Scinto

(57) ABSTRACT

A raster image processor (RIP) can process data for one page for each of a plurality of small areas, and handles each individual small area as a display list. Each individual display list holds information required to determine a rendering resolution. The RIP renders a small area including a text object with a high resolution, and a small area which does not include any text object with a low resolution. The RIP renders the respective small areas with the designated resolutions, and temporarily holds the rendering results in a memory for respective small areas. Upon generating a page image, the RIP directly transfers the high-resolution rendering result to a page memory. The RIP transfers the low-resolution rendering result to the page memory with applying an enlarging pixel process to the rendering result.

14 Claims, 35 Drawing Sheets

FIG. 5

| | | |
|---|---|---|
| INSTRUCTION IDENTIFIER <SET_PACKET> | 8bit | 501 |
| ORIGIN POINT Y-COORDINATE VALUE | INTEGER : 20bit | 502 |
| ORIGIN POINT X-COORDINATE VALUE | INTEGER : 20bit | 503 |
| PACKET AREA HEIGHT | INTEGER : 20bit | 504 |
| PACKET AREA WIDTH | INTEGER : 20bit | 505 |
| NUMBER OF Text EDGES | INTEGER : 8bit | 506 |
| NUMBER OF Small_text EDGES | INTEGER : 8bit | 507 |
| NUMBER OF Graphics EDGES | INTEGER : 8bit | 508 |
| NUMBER OF thin_Line EDGES | INTEGER : 8bit | 509 |
| NUMBER OF Image EDGES | INTEGER : 8bit | 510 |
| INSTRUCTION IDENTIFIER <LOAD_EDGES> | 8bit | 511 |
| NUMBER OF ADDITIONAL EDGES | 16bit | 512 |
| NextY COORDINATE | 20bit | 513 |
| VECTOR SEGMENT ADDRESS | 32bit | 514 |
| EDGE IDENTIFIER(T I S I G I L I I) | 5bit | 515 |
| LEVEL NUMBER | INTEGER : 24bit | 516 |
| INSTRUCTION IDENTIFIER <LOAD_EDGES> | 8bit | |
| NUMBER OF ADDITIONAL EDGES | 16bit | |
| NextY COORDINATE | 20bit | |
| VECTOR SEGMENT ADDRESS | 32bit | |
| EDGE IDENTIFIER(T I S I G I L I I) | 5bit | |
| LEVEL NUMBER | INTEGER : 24bit | |
| VECTOR SEGMENT ADDRESS | 32bit | |
| EDGE IDENTIFIER(T I S I G I L I I) | 5bit | |
| LEVEL NUMBER | INTEGER : 24bit | |

500

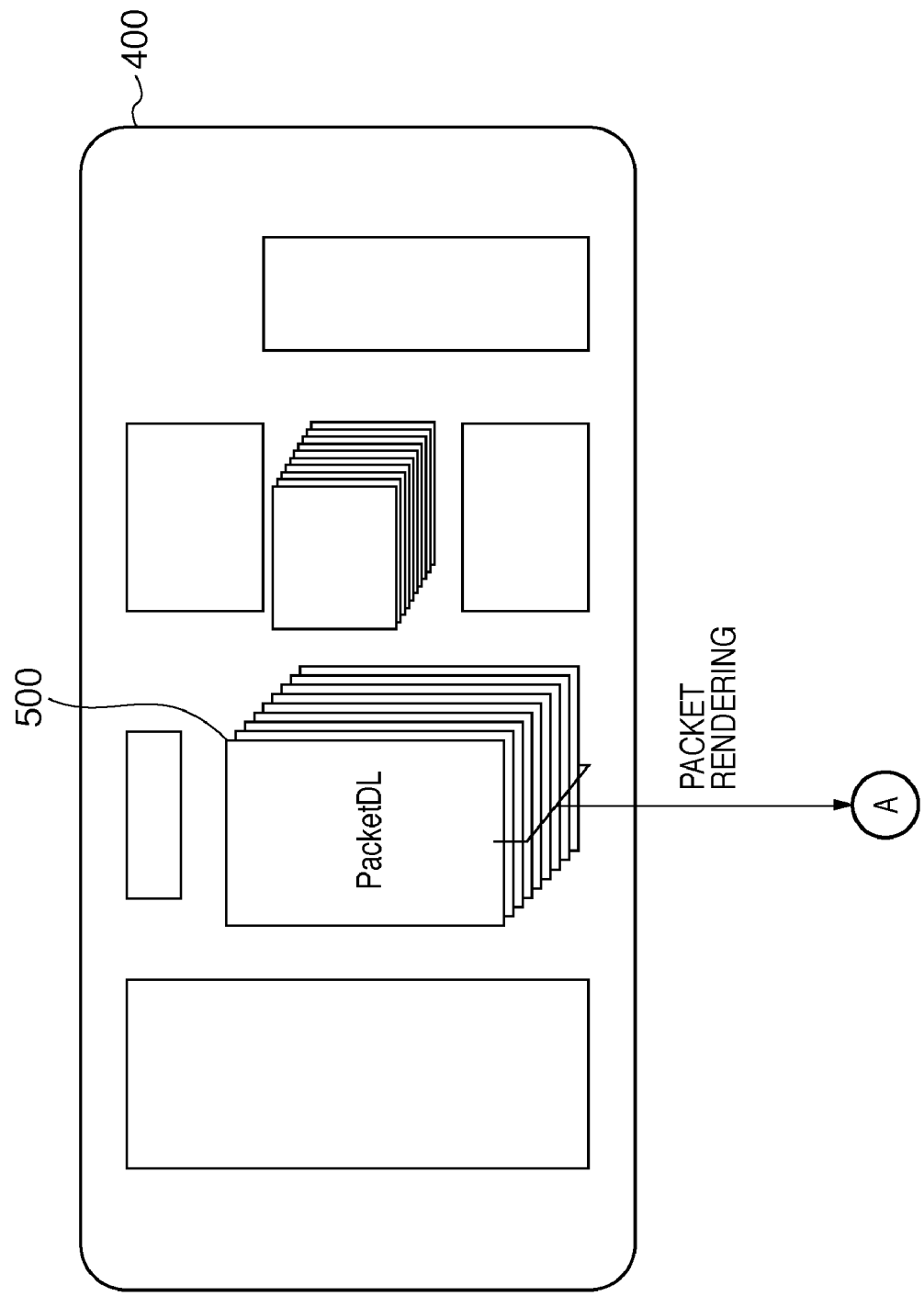

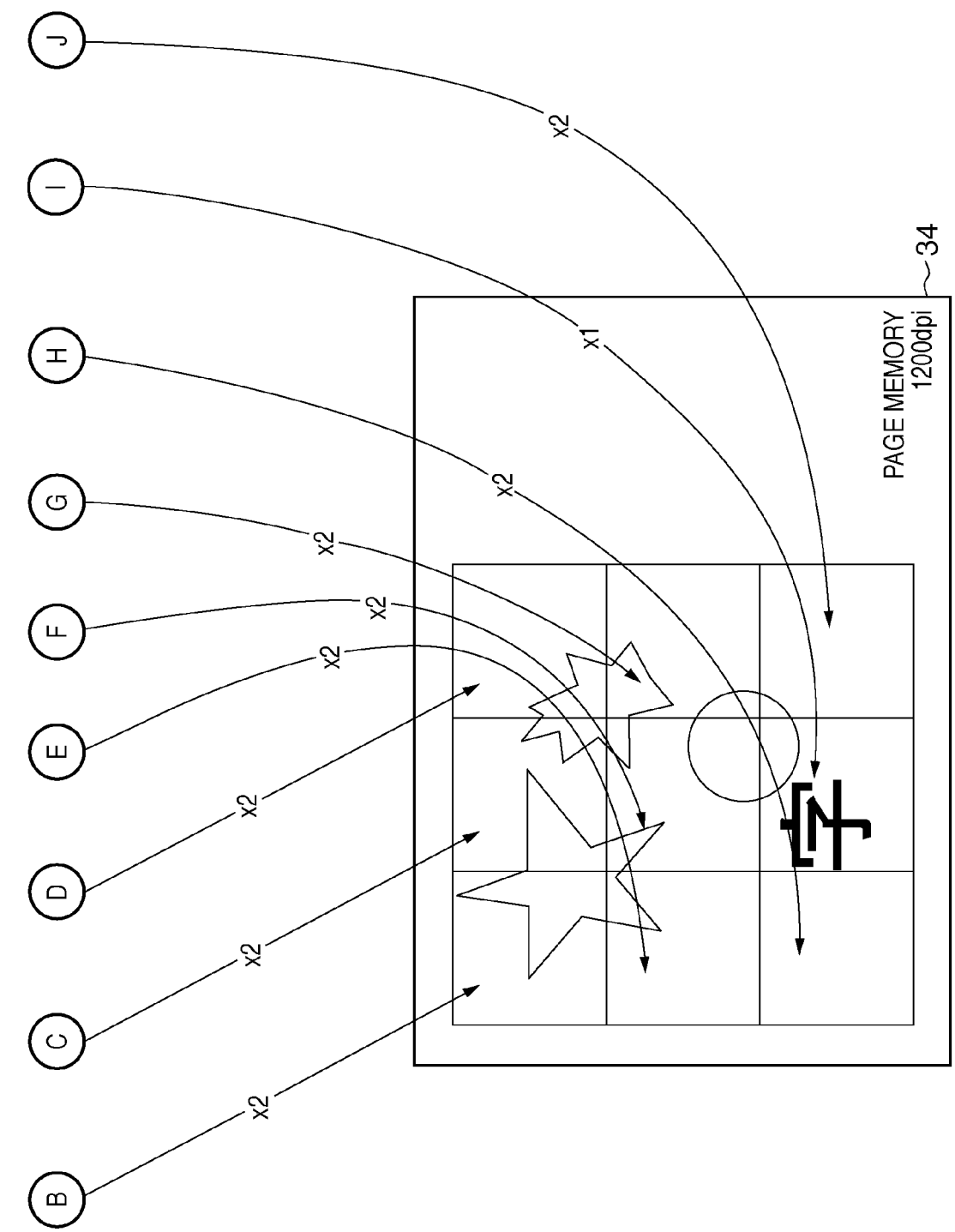

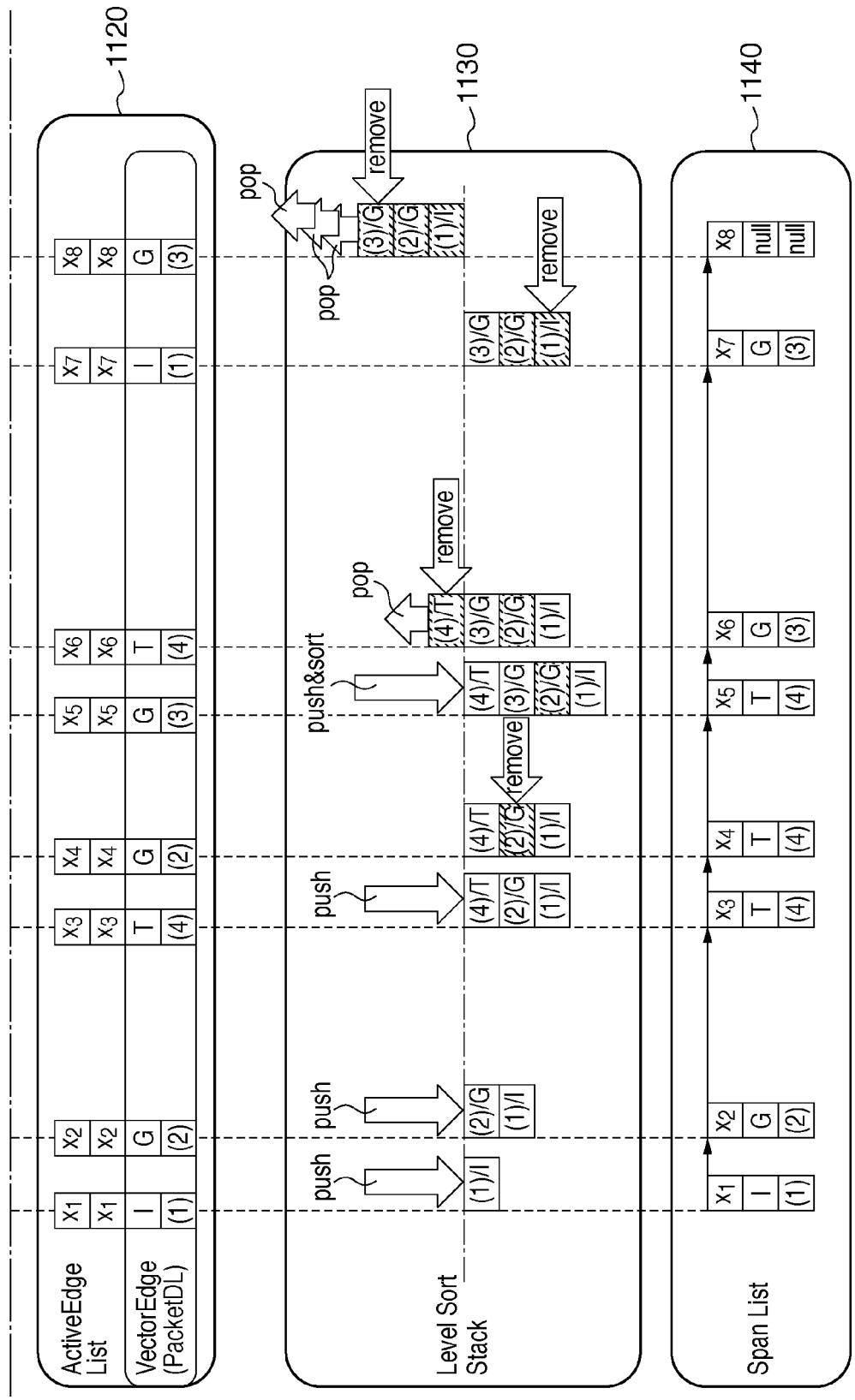

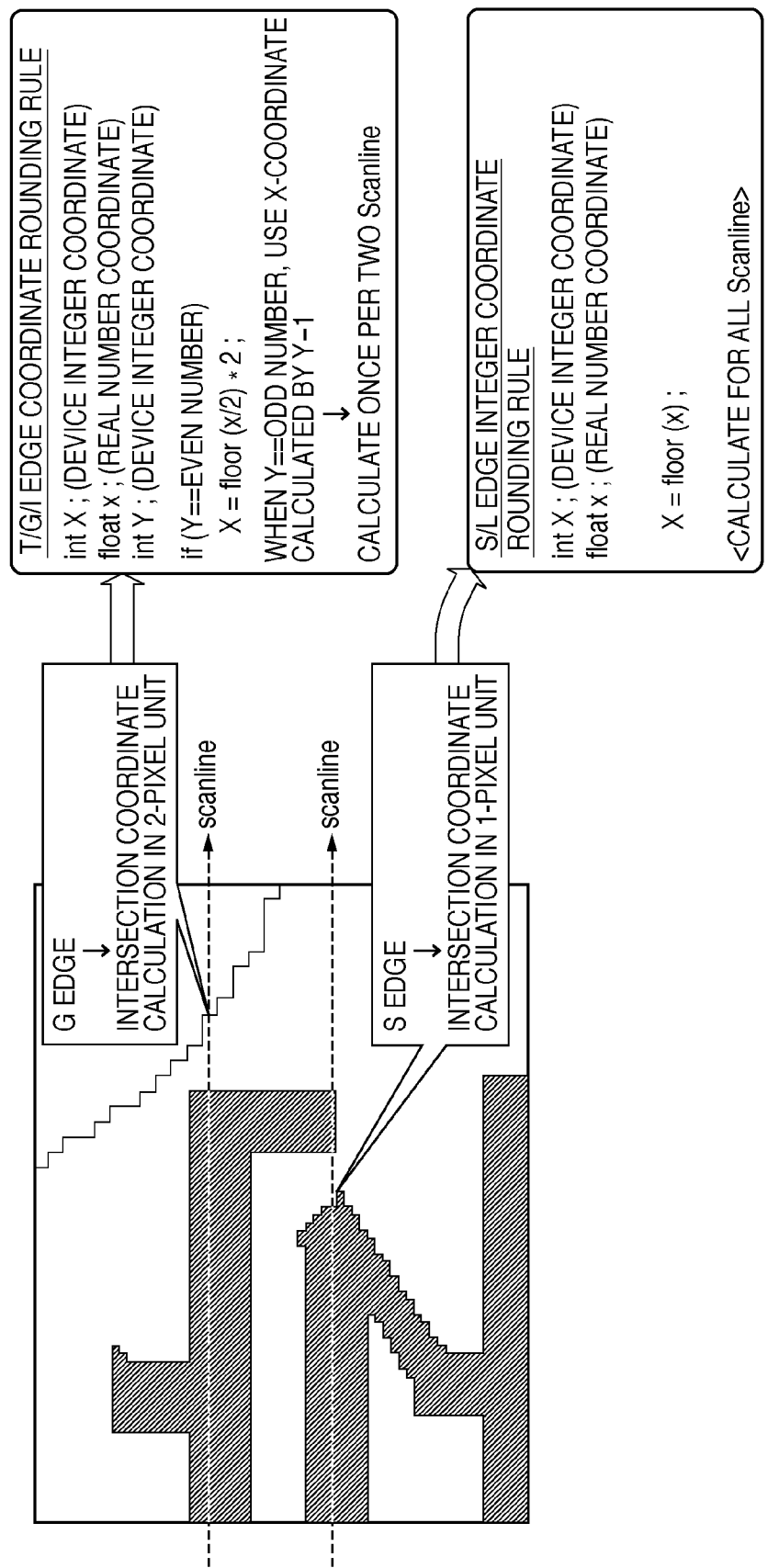

F I G. 16
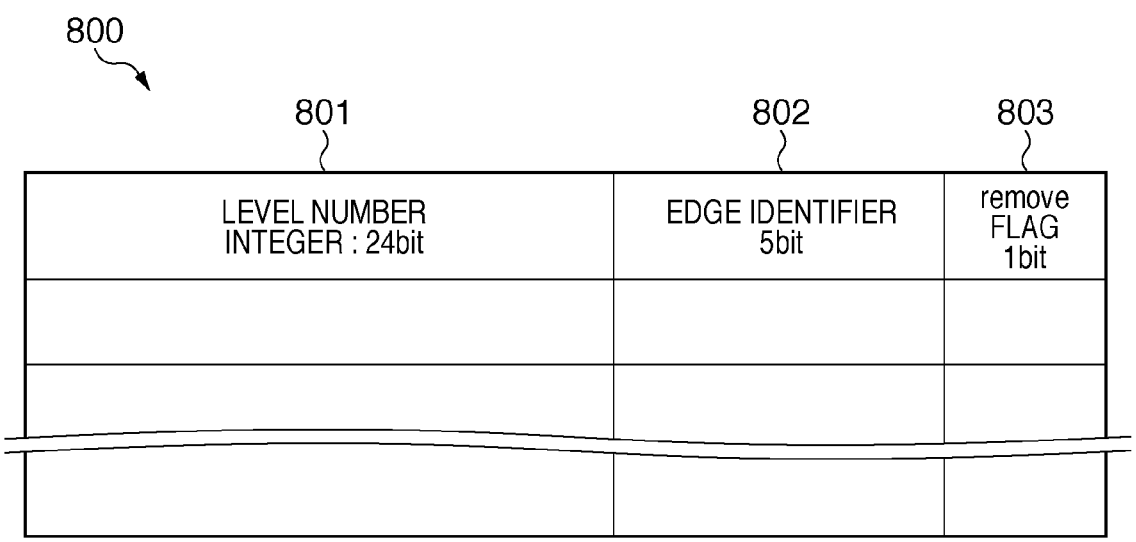

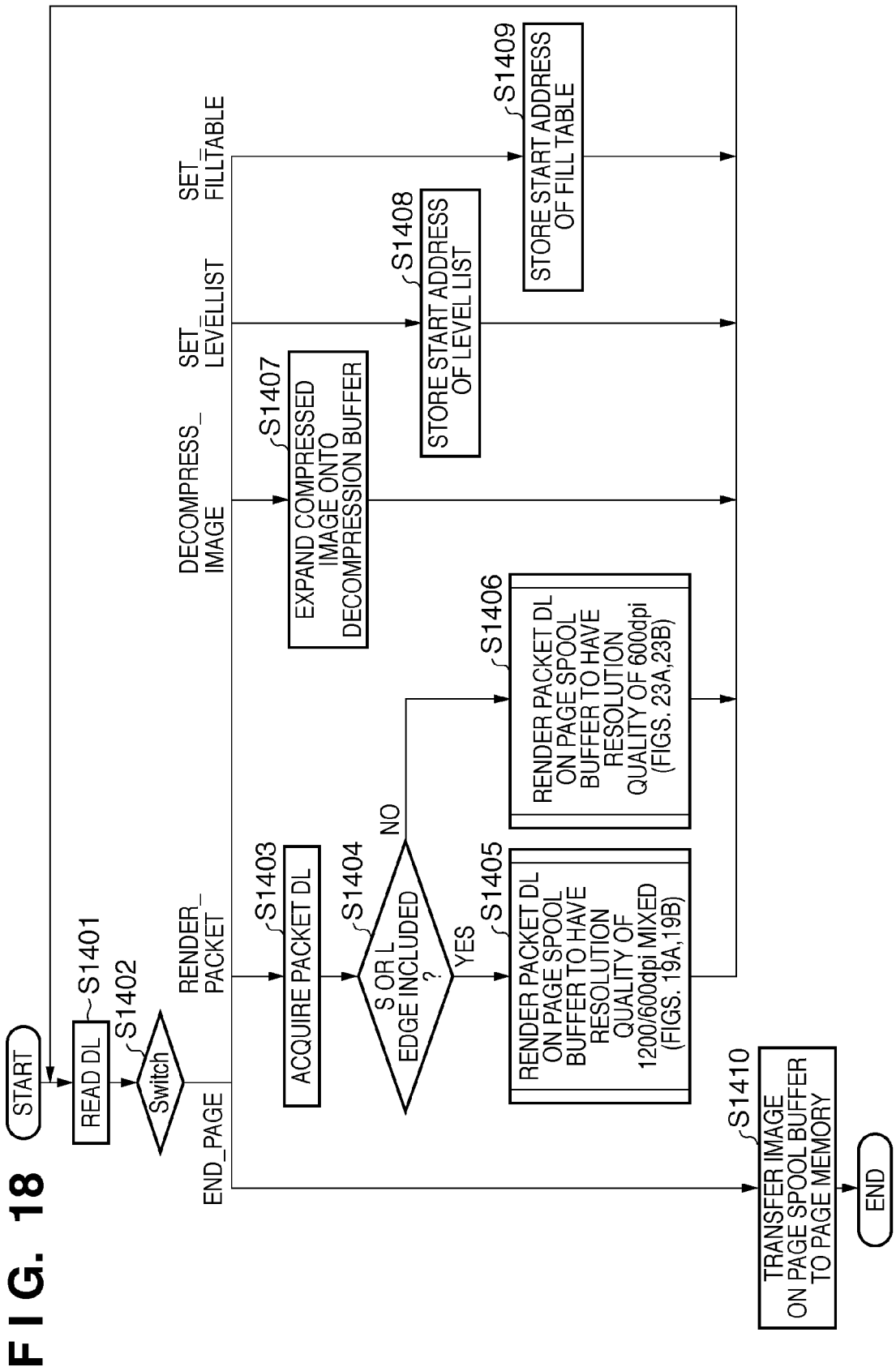

IMAGE PROCESSING METHOD, IMAGE PROCESSING APPARATUS, AND CONTROL METHOD THEREOF

BACKGROUND OF THE INVENTION

1. Field of the Invention

The present invention relates to an image processing method, image processing apparatus, control method thereof and, more particularly, to an image processing method for receiving and printing image data, an image processing apparatus having the function of the method, and a control method thereof.

2. Description of the Related Art

As printer technologies have advanced, the resolution of output onto media such as paper sheets is increasing. As the printer resolution increases, there are merits of improving the smoothness of lines and the tonality of colors represented by pseudo halftone. However, processing for generating a digital image (so-called rendering processing) requires a longer processing time and a larger memory size with increasing resolution, and the image quality and processing cost have a trade-off relationship.

As a conventional technique for speeding up high-resolution rendering processing, Japanese Patent Laid-Open Nos. 2000-137825 and 2000-149035 disclose a technique for efficiently sorting intersections of borders of objects.

Also, Japanese Patent Laid-Open No. 10-202960 discloses a technique for reducing the cost of rendering processing by rendering only a specific portion in a page to have a high resolution.

Furthermore, as a generally known technique, a smoothing technique which increases an output resolution by applying pixel interpolation and edge-shape pattern matching to a low-resolution, rendered image is popularly used.

However, even using the technique disclosed in Japanese Patent Laid-Open Nos. 2000-137825 and 2000-149035, high-resolution rendering often cannot sufficiently shorten the processing time or reduce the consumed memory size. In this case, it is effective to partially use low-resolution rendering within a range that does not influence image quality.

As a method of effectively improving print image quality while suppressing processing cost, high-resolution rendering processing may be executed while restricting it to only small characters and thin lines. However, it is impossible for the smoothing technique to improve the proportion of small characters of several points or less, or to express a high-resolution one-dot line.

On the other hand, with the technique disclosed in Japanese Patent Laid-Open No. 10-202960, since the resolution is decided for each area, a drawing object other than small characters and thin lines in a high-resolution area is also rendered to have a high resolution. For this reason, apparent unnaturalness due to changes in dot width and image quality occurs at the boundary with a neighboring low-resolution area.

SUMMARY OF THE INVENTION

The present invention has been made to solve the aforementioned problems, and achieves both high image resolution and low processing cost by rendering only small characters and thin lines to have a high resolution, and rendering other drawing objects to have a low resolution in the rendering processing.

That is, in a high-resolution area, only a specific drawing object which is effective to be rendered to have a high resolution undergoes high-resolution rendering processing, and other drawing objects are rendered to have a quality that matches a low-resolution. As a result, a natural drawing result is obtained while suppressing rendering processing cost.

In order to solve the aforementioned problems, an image processing apparatus of the present invention adopts the following arrangement. An image processing apparatus comprises: a drawing control unit adapted to handle a page of drawing data as a set of pieces of drawing data each provided by segmenting a page of image into a plurality of areas; and a rendering unit adapted to render drawing data of each segmented area in accordance with an instruction of the drawing control unit. The drawing control unit holds information used to determine a rendering resolution in association with a drawing object in each segmented area, and the rendering unit determines a rendering resolution of a drawing object in each area based on the information used to determine the rendering resolution.

A method of controlling an image processing apparatus, comprises: a drawing control step of handling a page of drawing data as a set of pieces of drawing data each provided by segmenting a page of image into a plurality of areas; and a rendering step of rendering drawing data of each segmented area in accordance with an instruction in the drawing control step. In the drawing control step, information used to determine a rendering resolution is held in association with a drawing object in each segmented area, and in the rendering step, a rendering resolution of a drawing object in each area is determined based on the information used to determine the rendering resolution.

An image processing method for handling a page of drawing data as a set of pieces of drawing data each provided by segmenting a page of image into a plurality of areas, comprises the steps of: holding information representing a type of drawing object in association with a drawing object in each segmented area; and rendering, in each segmented area, a drawing object of a specific type with a high resolution and a drawing object other than the drawing object of the specific type with a low resolution.

According to the present invention, specific rendering objects such as small characters and thin lines are rendered to have a high resolution, and other drawing objects are rendered to have a low resolution. As a result, a small area that does not include any specific drawing objects undergoes low-resolution rendering, thus allowing rendering processing while reducing a memory size and calculation cost.

That is, a small area including a specific drawing object undergoes high-resolution rendering. However, only the specific drawing object in the small area is rendered to have high-resolution quality, and the rendering quality of other drawing objects can be set to be equivalent to that of surrounding small areas rendered to have a low resolution.

Further features of the present invention will become apparent from the following description of exemplary embodiments with reference to the attached drawings.

BRIEF DESCRIPTION OF THE DRAWINGS

FIG. 5 is a view showing an example of the data configuration of a packet DL in the display list shown in FIG. 4;

FIGS. 8A-8C are pattern diagrams for explaining the overall operation of rendering processing of the packet DL according to this embodiment;

FIGS. 9A and 9B are pattern diagrams for explaining the internal operation upon execution of rendering of a scan-line according to this embodiment;

FIG. 11 is a pattern diagram showing a part of drawing processing when high- and low-resolution portions are mixed;

FIG. 16 is a view showing an example of the data configuration of a level sort stack according to this embodiment;

FIG. 18 is a flowchart showing an example of the sequence of the overall rendering processing of the packet DL according to this embodiment;

DETAILED DESCRIPTION OF THE EMBODIMENTS

Embodiments for carrying out the present invention will be described in detail hereinafter with reference to the drawings. Note that the following embodiment will exemplify a digital MFP as an image processing apparatus which implements the present invention, but the present invention is not limited to such a specific apparatus. The present invention can be widely applied to a technique executed for respective small areas obtained by segmenting drawing of an overall image, and is also applicable to display of an image. Furthermore, the present invention is widely applicable to word-processing (word-processor) software, spreadsheet software, and drawing software. They are also included in the present invention.

(Arrangement Example of Digital MFP as Image Processing Apparatus of this Embodiment>

Figure 1:
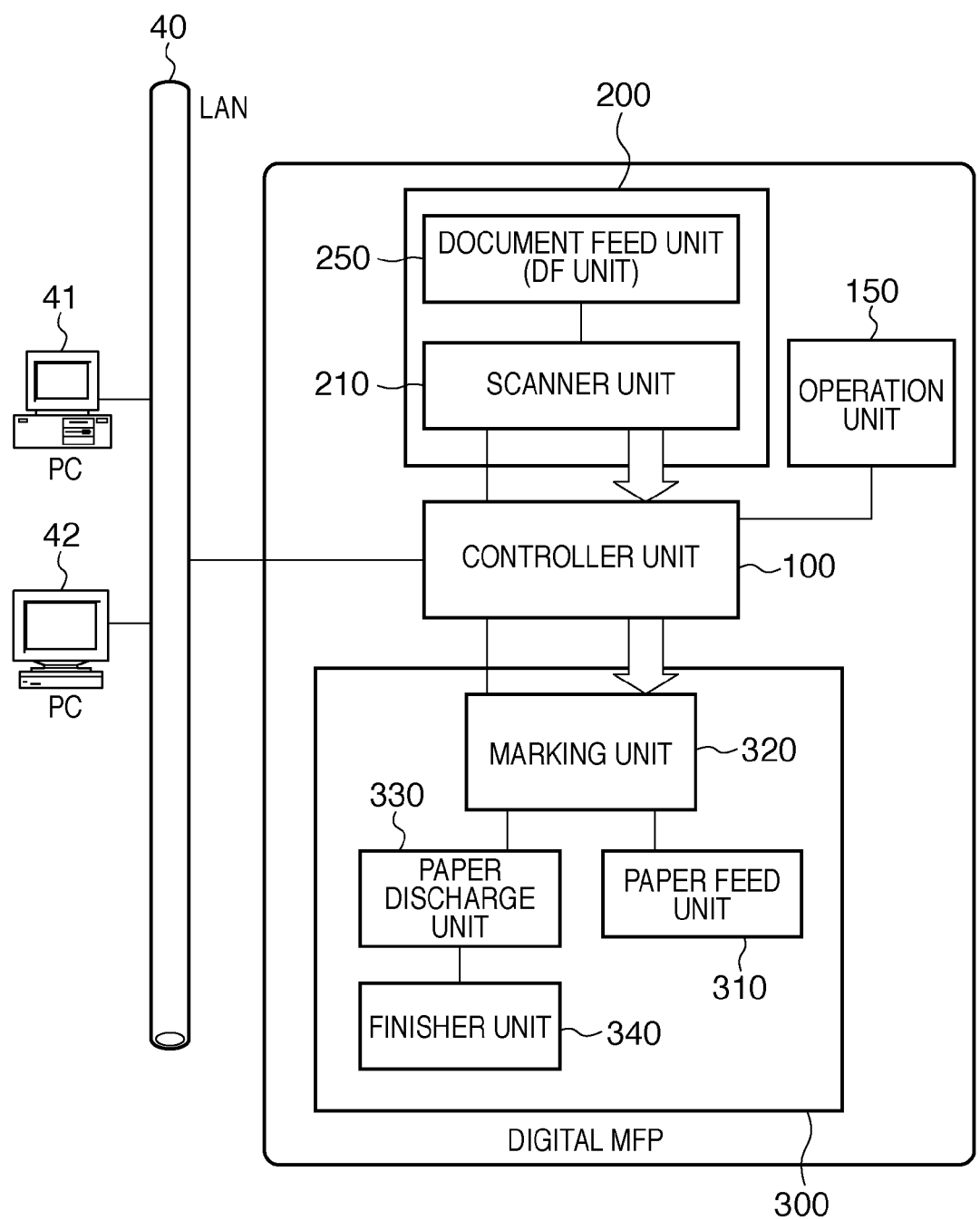
FIG. 1 is a block diagram showing an example of the system arrangement including a digital multi-function peripheral (MFP) according to an embodiment of the present invention.

An example of the overall arrangement of a digital MFP of this embodiment will be described below with reference to FIG. 1.

A reader unit 200 which is also referred to as an image input device optically reads a document image, and converts the read image into image data. The reader unit 200 includes a scanner unit 210 having a function of reading a document image, and a document feed unit 250 having a function of conveying a document sheet.

A printer unit 300 which is also referred to as an image output device conveys a print sheet, prints image data on the print sheet as a visible image, and discharges the print sheet outside the apparatus. The printer unit 300 has a paper feed unit 310 having a plurality of types of print sheet cassettes, and a marking unit 320 having a function of transferring and fixing image data on a print sheet. Also, the printer unit 300 has a paper discharge unit 330 having a function of outputting the printed print sheet outside the apparatus, and a finisher unit 340 for executing staple processing and sort processing.

A controller unit 100 as a control device is electrically connected to the reader unit 200 and printer unit 300, and is further connected to host computers 41 and 42, and various servers on the Internet via a network (LAN) 40. The controller unit 100 controls the reader unit 200 to read image data of a document, and controls the printer unit 300 to output the image data onto a print sheet, thus providing a copy function. The controller unit 100 also provides a scanner function of converting image data read from the reader unit 200 into code data, and transmitting the code data to the host computer via the network 40. Furthermore, the controller unit 100 provides a printer function of converting print job data received from the host computer via the network 40 into image data, and outputting the image data to the printer unit 300. Moreover, the controller unit 100 provides a box function of saving image data read from the reader unit 200 and image data converted from print job data received from the host computer in a secondary storage device in the controller section. In addition, the controller unit 100 provides a job control function for received print job data.

An operation unit 150 includes a liquid crystal touch panel, and is connected to the controller unit 100 to provide a user I/F used to operate this digital MFP.

<Hardware Arrangement Example of Controller Section>

Figure 2:
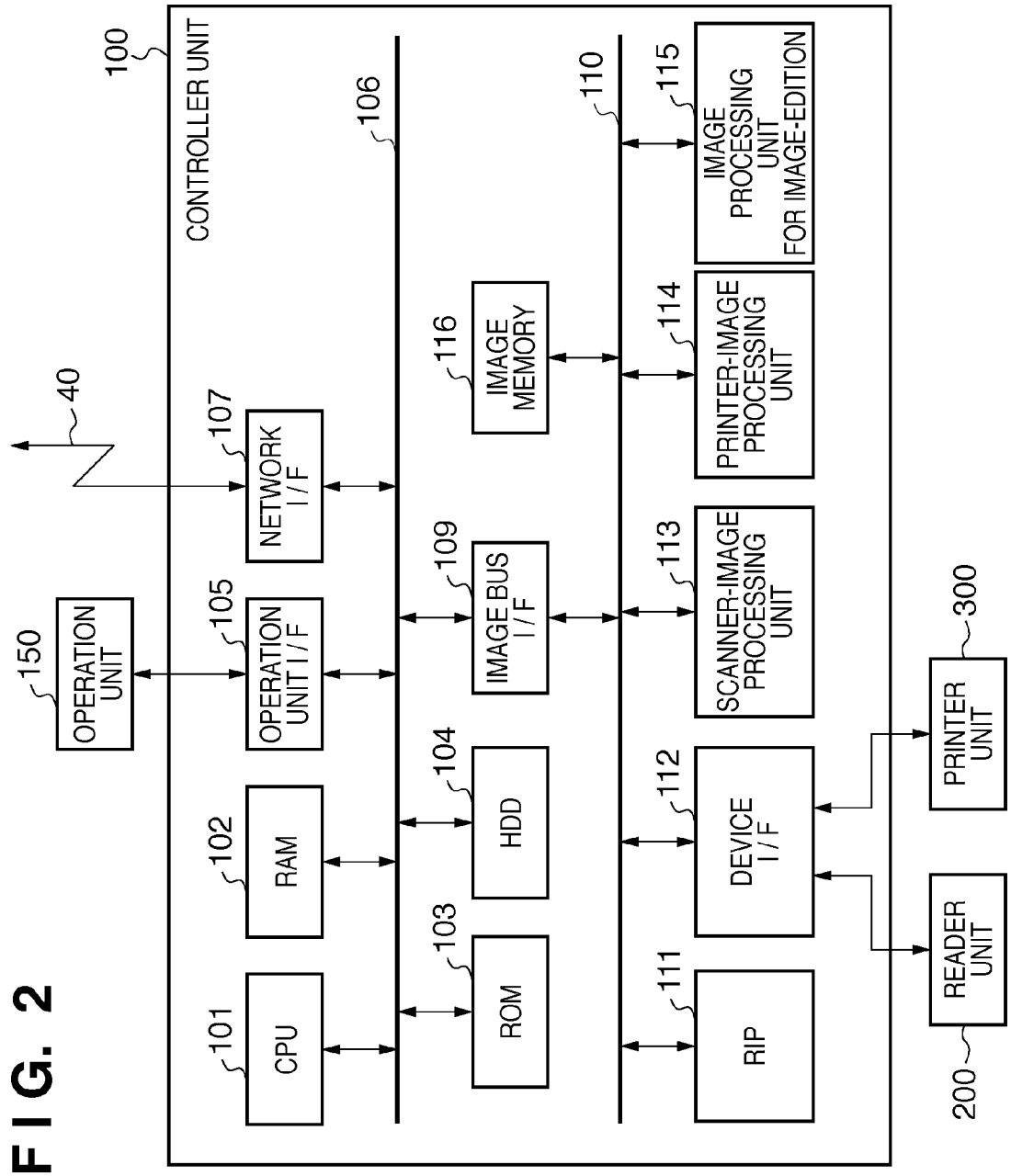
FIG. 2 is a block diagram showing an example of a hardware arrangement of a controller section of the digital MFP according to this embodiment.

FIG. 2 is a block diagram showing an example of the hardware arrangement of the controller unit 100 of the digital MFP according to this embodiment.

Referring to FIG. 2, the controller unit 100 is connected to the reader section (scanner) 200 as an image input device and the printer section (printer engine) 300 as an image output device, and controls to read and print out image data. The controller unit 100 is connected to the LAN 40 and controls to input/output image information and device information via the LAN 40.

A CPU 101 is a central processing unit used to control the overall digital MFP, and executes drawing control for an RIP 111 of this embodiment. A RAM 102 is a system work memory required for the operation of the CPU 101, and is also a memory for temporarily storing input document image data. Furthermore, a ROM 103 is a boot ROM, which stores a boot program of the system. An HDD 104 is a hard disk drive, which stores system software for various kinds of processing, input image data, intermediate codes, and the like. An operation unit I/F (interface) 105 is an interface unit for the operation unit 150 having a display screen, which can display image data and the like, and outputs operation screen data to the operation unit 150. The operation unit I/F 105 has a role of transferring information input by an operator from the operation unit 150 to the CPU 101. A network interface (I/F) 107 is implemented by, for example, a LAN card, and is connected to the LAN 40 to exchange information with an external apparatus. The aforementioned units are connected to a system bus 106.

An image bus I/F 109 is an interface used to connect the system bus 106 and an image bus 110 that transfers image data at high speed, and is a bus bridge, which converts a data structure. On the image bus 110, a raster image processor (RIP) 111, device I/F 112, scanner-image processing unit 113, printer-image processing unit 114, and image processing unit for image-edition 115 are connected.

The raster image processor (RIP) 111 expands a page description language (PDL) code and display list (DL) to images to generate drawing data. The device I/F 112 connects the reader unit 200 and printer unit 300 to the controller unit 100, and converts a synchronous system/asynchronous system of image data. The scanner-image processing unit 113 applies various kinds of processing such as correction, modification, and editing to image data input from the reader unit 200. The printer-image processing unit 114 applies processing such as correction and resolution conversion suited to the printer unit 300 to image data to be printed out. The image processing unit for image-edition 115 executes various kinds of image processing including rotation and compression/decompression processing of image data. An image memory 116 stores image data expanded by the RIP 111 and image data read from the reader unit 200, or may be used as a primary storage during processing.

<Functional Arrangement Example by Software of Controller Section>

Figure 3:
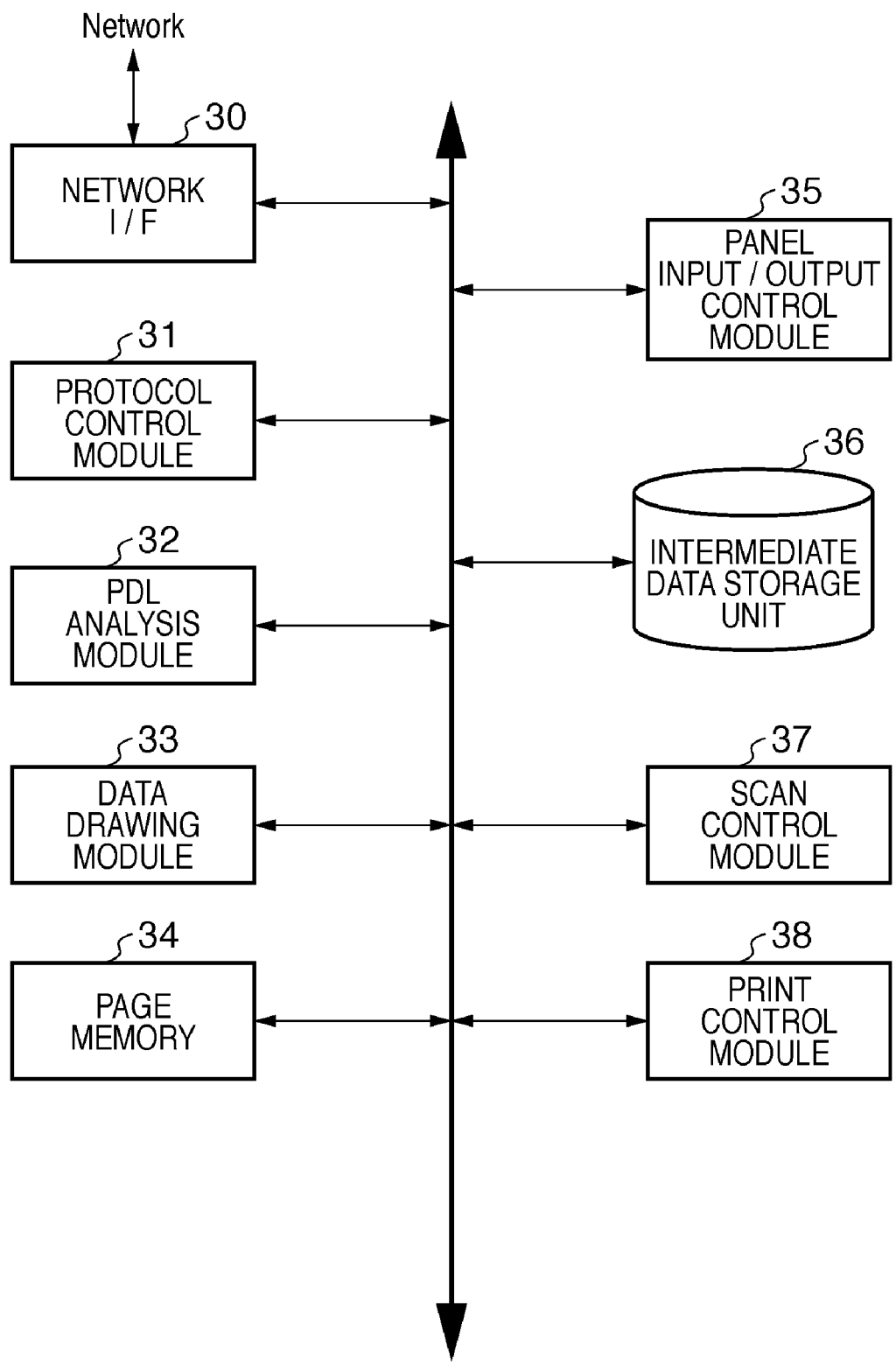
FIG. 3 is a block diagram showing an example of the functional arrangement implemented by software of the controller section according to this embodiment.

FIG. 3 is a block diagram showing an example of the functional arrangement which is implemented as software by the controller unit 100 which controls the operation of the digital MFP and has the arrangement shown in FIG. 2. These functional modules are implemented when the CPU 101 executes programs loaded from the HDD 104 onto the RAM 102 while using the hardware shown in FIG. 2. Note that the function of a data drawing module 33 is also implemented by a CPU in the RIP 111 in FIG. 2.

A network interface (I/F) 30 is a functional module, which includes the network I/F 107 in FIG. 2, and is used to exchange information with external devices. A protocol control module 31 is a functional module used to communicate with external devices by analyzing and transmitting a network protocol.

A PDL analysis module 32 is a functional module used to analyze PDL data received as document image data, and to convert the PDL data into an intermediate code (for example, a display list to be described later) in a format that allows easier processing. An intermediate code generated by the PDL analysis module 32 is passed to and is processed by a data drawing module 33. Note that display lists of intermediate codes may be generated by the host computers 41 and 42, and may be received by the network I/F 30.

The data drawing module 33 is a functional module which includes the RIP 111 shown in FIG. 2, and is used to expand the display list of the intermediate code to bitmap data as drawing data for respective areas in this embodiment. The expanded bitmap data is sequentially drawn on a page memory 34. The page memory 34 is a volatile memory which temporarily holds bitmap data expanded by the data drawing unit 33.

A panel input/output control module 35 is a functional module which includes the operation unit I/F 105 shown in FIG. 2, and controls inputs/outputs to/from the operation unit 150. An intermediate data storage unit 36 stores some or all of the display list of the intermediate code, and is implemented by a secondary storage device such as a hard disk. A scan control module 37 includes the scanner-image processing unit 113 shown in FIG. 2, and applies various kinds of processing such as correction, modification, and editing to image data input from the reader unit 200. A print control module 38 includes the printer-image processing unit 114 shown in FIG. 2, converts the contents of the page memory 34 into a video signal, and transfers the video signal of an image to the printer unit 300. The printer unit 300 is a printer engine used to form a permanent visible image of the received video signal on a print sheet.

<Configuration Example of Display List of this Embodiment>

An example of the configuration of a display list used as a data drawing source in the controller unit 100 will be described below with reference to FIGS. 4 to 7. Note that this display list is an intermediate code which is obtained by analyzing PDL data received as document image data by the PDL analysis module 32, and converting the PDL data into a format that allows easier processing. The present invention has a characteristic feature in processing from the display list, and a detailed description of conversion by the PDL analysis module 32 will not be given. Note that rendering processing of a page by the data drawing module 33 (RIP 111) of this embodiment uses a coordinate system which has one dot as a unit, and an upper left position of the page as an origin point.

(Overall Configuration Example of Display List)

Figure 4:
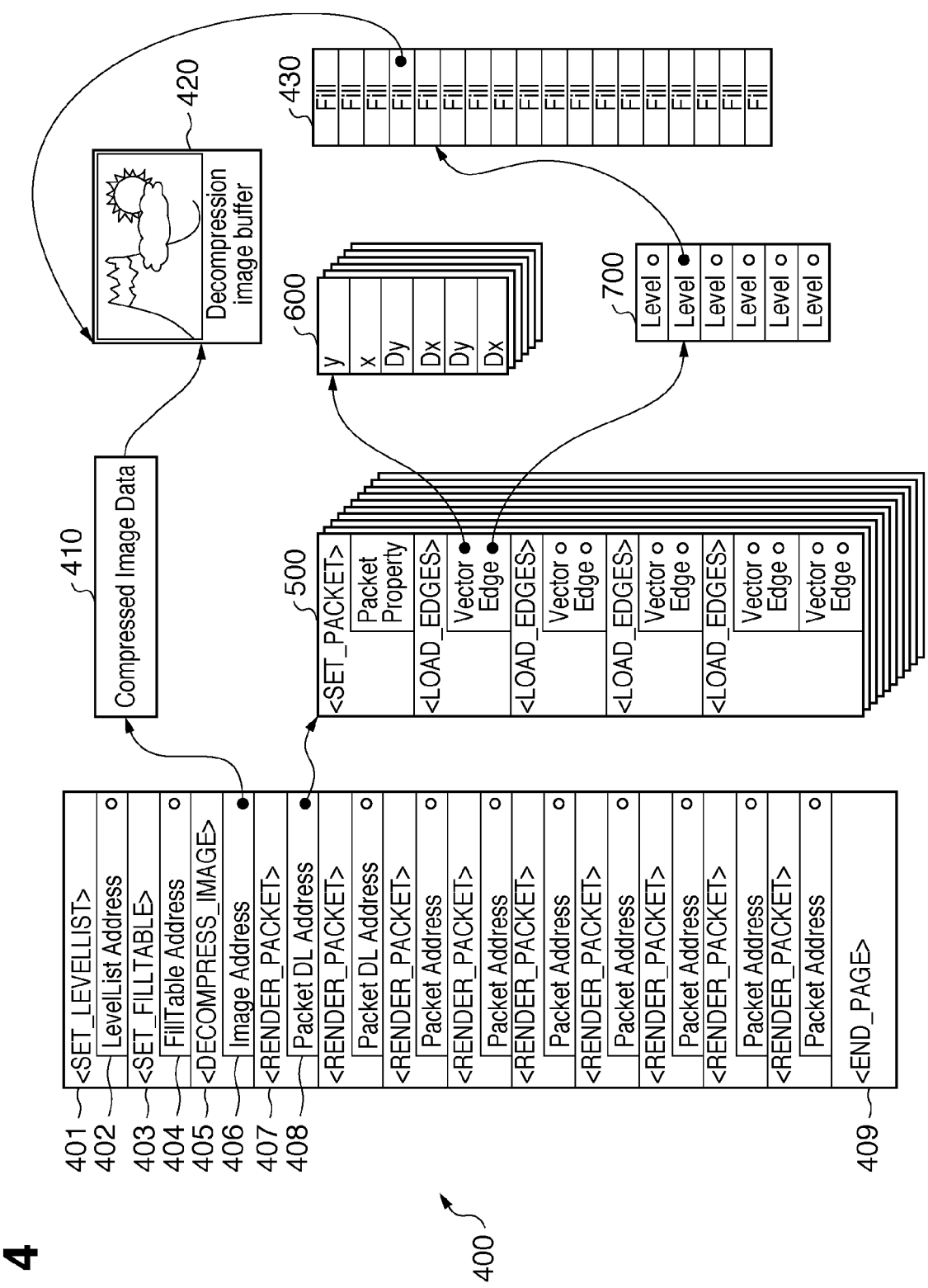
FIG. 4 is a view showing an example of the data configuration of a display list according to this embodiment.
Figure 6:
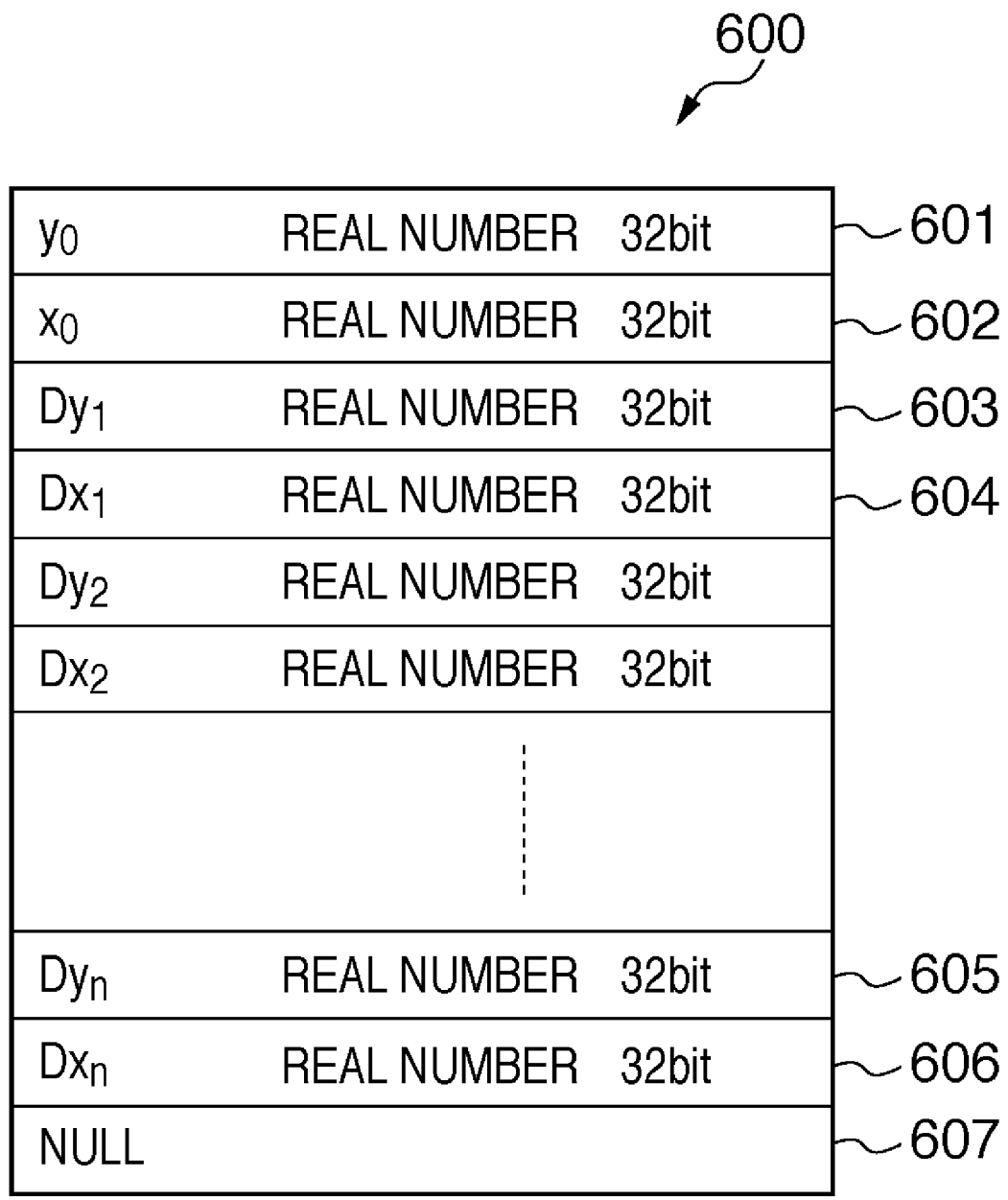
FIG. 6 is a view showing an example of the data configuration of a vector edge segment in the display list shown in FIG. 4.
Figure 7:
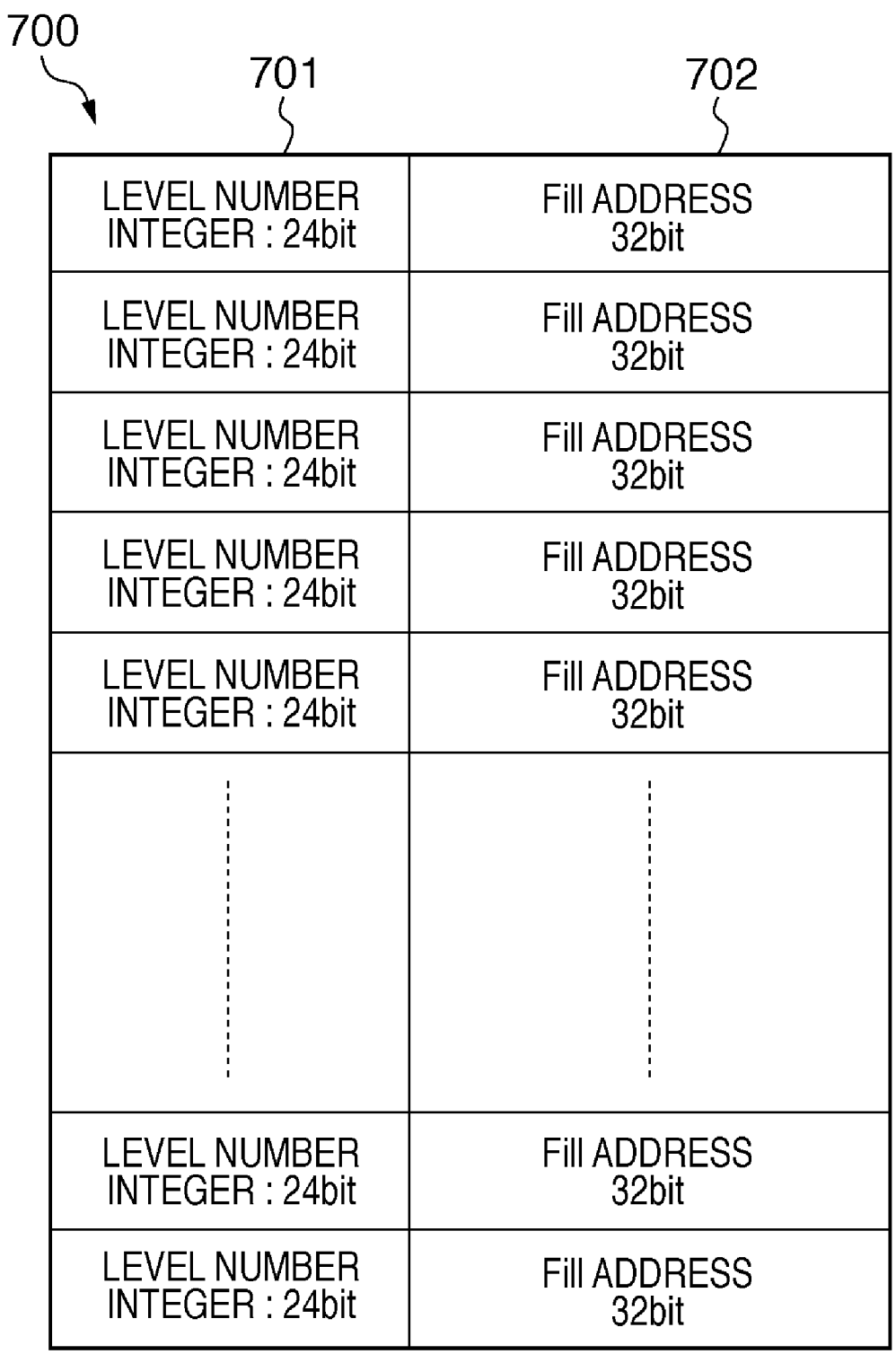
FIG. 7 is a view showing an example of the data configuration of a level list in the display list shown in FIG. 4.

FIG. 4 is a view showing an example of the overall data configuration of the display list of this embodiment. FIGS. 5 to 7 are views showing details of components of the display list shown in FIG. 4.

A display list 400 includes information required to render an area corresponding to one page. In FIG. 4, reference numerals 401 to 409 denote instructions which give the instruction for start processes of respective stages of the rendering processing. Each individual instruction is paired with additional information as needed.

The instruction 401 is <SET_LEVELLIST>, and is paired with a level list address 402 as additional information. This instruction 401 gives the instruction to set a level list 700 to be described later with reference to FIG. 7. That is, the level list address 402 is stored in a memory in the RIP 111, and is referred to as a start address of the level list 700 in the processing of the RIP 111.

The instruction 403 is <SET_FILLTABLE>, and is paired with a fill table address 404 as additional information. This instruction 403 gives the instruction to set a fill table 430 to be described later. More specifically, the fill table address 404 is stored in a memory in the RIP 111, and is referred to as a start address of the fill table 430 in the processing of the RIP 111.

The instruction 405 is <DECOMPRESS_IMAGE>, and is paired with an image address 406 to compressed image data as additional information. This instruction 405 gives the instruction to expand (decompress) compressed image data 410 to be described later. That is, the compressed image data 410 referred to by the image address 406 is expanded onto a decompression image buffer 420. Note that the compression format of the compressed image data 410 uses JPEG or JBIG.

The instruction 407 is <RENDER_PACKET>, and is paired with a packet DL address 408 as additional information. This instruction 407 gives the instruction to render each rectangle area obtained by segmenting an expanded image for one page into a plurality of rectangle areas (to be also referred to as small areas hereinafter). That is, a packet DL 500 for each area, which is referred to by the packet DL address 408, is acquired from the display list 400. The packet DL address 408 is stored in a memory in the RIP 111, and is referred to by the RIP 111 as a start address of the packet DL 500. Such <RENDER_PACKET> and packet DL 500 are prepared as many as the number of segmented rectangle areas.

The instruction 409 is <END_PAGE>, and has no additional information.

Reference numeral 410 denotes compressed image data, and the position of the compressed image data in a memory is indicated by the image address 406. Reference numeral 420 denotes a decompression image buffer, which is used as an expansion destination of the compressed image data 410.

(Configuration Example of Packet DL)

FIG. 5 is a view showing an example of the configuration of the packet DL 500 referred to by the packet DL address 408.

Reference numeral 500 denotes a data structure, which is required to draw a specific rectangle area in one page, and is called a packet DL. The packet DL can include two types of instructions.

An instruction 501 is <SET_PACKET>, and has various kinds of information required to draw the packet DL as additional information. Reference numerals 502 and 503 denote upper left coordinate values of the rectangle area. These coordinate values are called an origin point of the packet DL. Reference numerals 504 and 505 denote a height and width of the rectangle area. Reference numerals 506 to 510 denote the numbers of various edges included in the packet DL. The packet DL includes five types of edges, that is, TEXT, Small_text, Graphics, thin_Line, and Image. In the following description, these edges may often be abbreviated as T, S, G, L, and I as edge identifiers. Note that T is an edge of a text object; S, an edge of a small-text object; G, an edge of a graphics object; L, an edge of a thin-line object; and I, an edge of an image object.

An instruction 511 is <LOAD_EDGES>, and is used to give the instruction for drawing of edges. This instruction 511 has the number 512 of additional edges and a NextY coordinate 513 as additional information. Furthermore, the instruction 511 has, as additional information, three pieces of information associated with a vector edge to be drawn, that is, a vector segment address 514, edge identifier 515, and level number 516 as a set, which are used in drawing of one vector edge.

(Configuration Example of Vector Segment)

FIG. 6 is a view showing an example of the configuration of a vector segment 600 referred to by the vector segment address 514.

Reference numeral 600 denotes a vector segment which holds coordinate information of a vector edge to be drawn. The vector edge is expressed by a set of a plurality of successive line segments.

Reference numerals 601 and 602 denote absolute coordinate values y0 and x0, which indicate a start point of the vector edge. Reference numerals 603 and 604 denote relative coordinate values Dy1 and Dx1, respectively, which indicate a terminal point of a line segment which starts from that start point. Furthermore, a line segment that follows this line segment is also expressed as relative coordinate values. Relative coordinate values Dyn 605 and Dxn 606 which represent a last line segment of the vector edge are followed by a NULL value 607 indicating a terminal point of the edge.

(Configuration Example of Level List)

FIG. 7 is a view showing an example of the configuration of the level list 700 referred to by the level number 516.

Reference numeral 700 denotes a level list. A level is a concept that represents overlapping of an object to be drawn, and a drawing object having a large level value covers over a drawing object having a small level value. For this reason, when a plurality of drawing objects exist to overlap each other on identical coordinates, only a drawing object having the largest level value is rendered.

Reference numeral 701 denotes a number indicating a level value. Reference numeral 702 denotes a fill address at which "Fill" corresponding to the level value 701 is stored. "Fill" is information required to determine color values of a pixel, and is stored in the fill table 430.

<Concept Example of Drawing Sequence of this Embodiment>

(Drawing Example of One Page of this Embodiment)

Figure 8B:
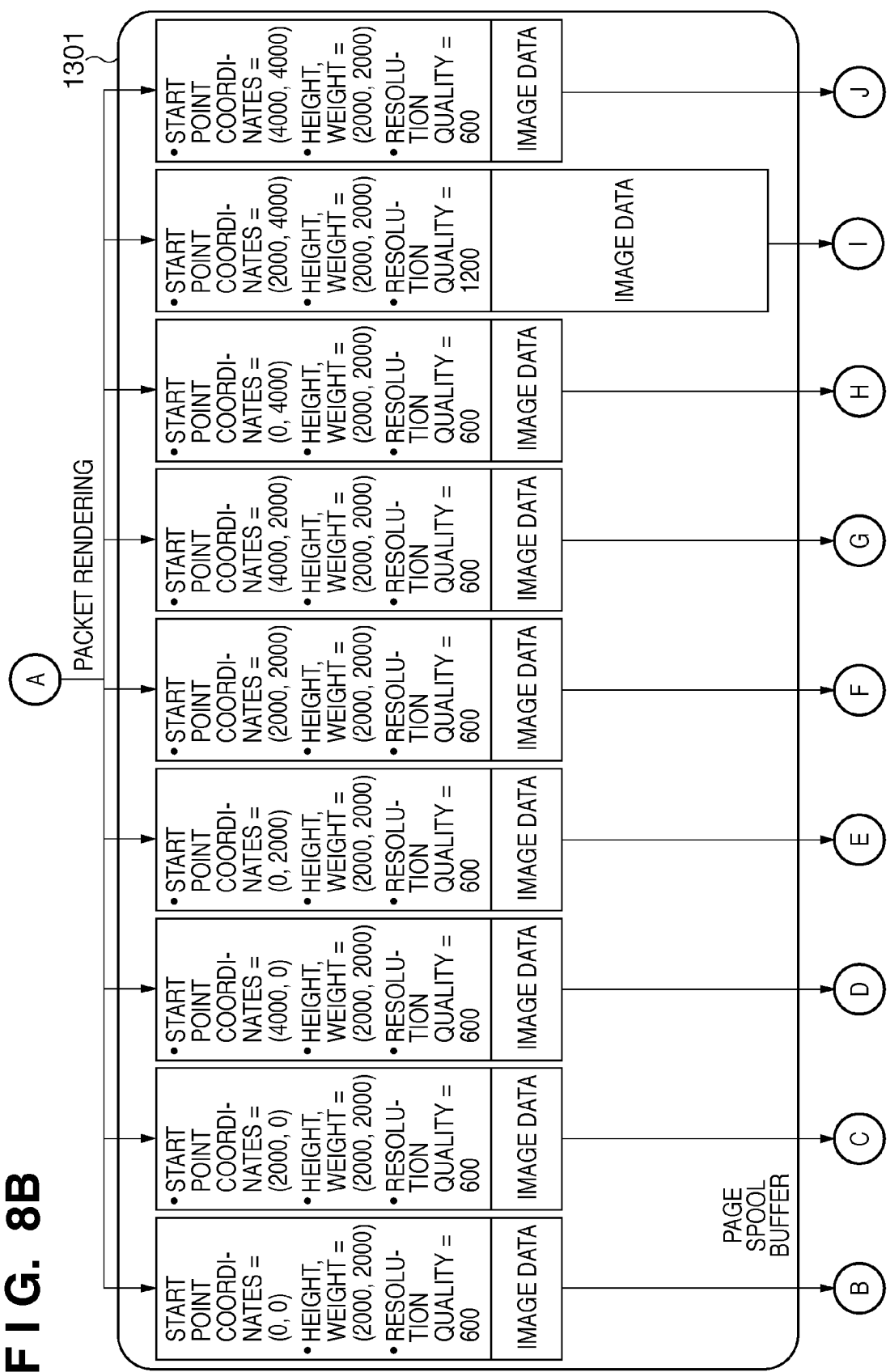

FIGS. 8A-8C are pattern diagrams for explaining the overall operation of rendering processing based on a packet DL.

FIG. 8A shows the display list 400 which has been described above using FIGS. 4 to 7. As described above, the display list 400 has packet DLs 500 as many as the number of rectangle areas obtained by segmenting one page. This example shows a case of nine rectangle areas obtained by segmenting one page into three in the main scan direction and three in the sub-scan direction.

FIG. 8B shows a state in which rendering results for respective rectangle areas based on the nine packet DLs 500 are stored in a page spool buffer 1301. Image data of each rendering result is appended with coordinate value information of each rectangle area (start point coordinates of the upper left position, and a height and width of that rectangle area), and resolution quality information. In this example, the resolution quality used when an S or L edge is included is recorded as 1200 dpi or 600 dpi, and that used when neither an S edge nor an L edge is included is recorded as 600 dpi, as will be described in detail later.

In the example of FIGS. 8A-8C, the resolution quality of a rectangle area including a character "字" is 1200 dpi or 600 dpi, and that of the remaining eight rectangle areas is 600 dpi.

FIG. 8C shows a rendering result of one page, which is obtained by transferring the results for respective rectangle areas stored in the page spool buffer 1301 in the middle view to the page memory 34. In this case, images of the rectangle areas rendered to have the 600-dpi quality are expanded on the page memory at a ×2 scaling factor. An image of the rectangle area rendered to have the 1200- or 600-dpi quality is expanded to be non-scaled.

(Drawing Example of One Line in Rectangle Area of this Embodiment)

FIGS. 9A, 9B, 10A and 10B are pattern diagrams for explaining the internal operation upon execution of rendering of one scan-line in a rectangle area of this embodiment.

Reference numeral 1100 denotes a view that represents the relationship of objects laid out in a rectangle area to be drawn. In turn from the bottom in an overlapping order of drawing objects, an image object 1102, circular graphics object 1103, triangular graphics object 1104, and character object 1105 are laid out. Execution of rendering for one scan-line 1101 in this rectangle area will be examined below.

The overlapping state of the respective drawing objects on the scan-line 1101 is represented by a view 1110. The objects which are laid out at upper positions of the overlapping order have larger level values.

Figure 9A:
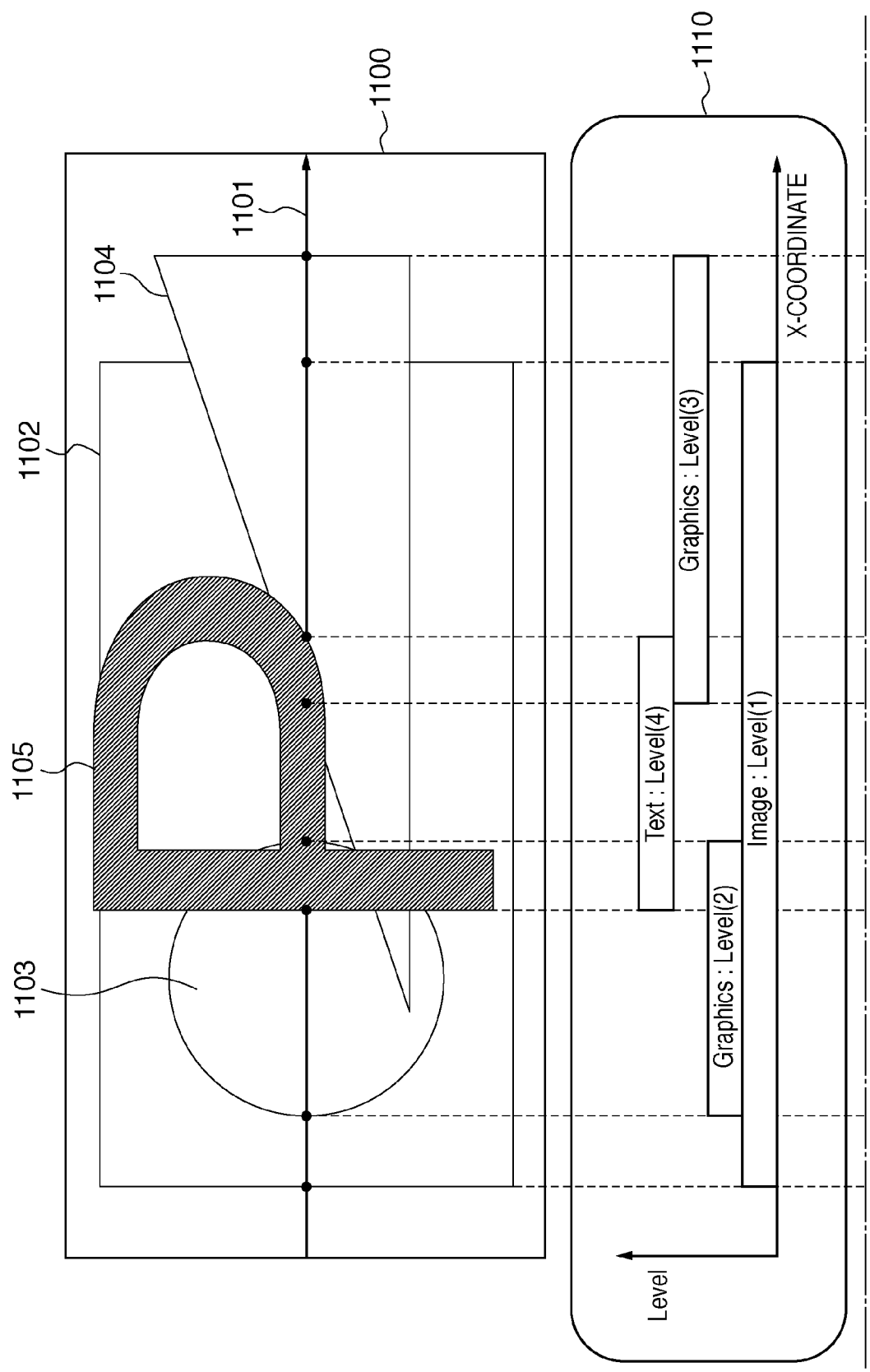

An active edge list 900 (to be described later with reference to FIG. 15) on one scan-line 1101 is created on a memory based on the packet DL 500 of the display list 400 in FIG. 4. This processing is implemented according to processing rules shown in FIGS. 21A and 21B to be described later. Initially, all vector edges (indicated by the edge identifiers (T, S, G, L, and I) 515 and level numbers (Level) 516 in FIG. 5) are entered. Then, only vector edges which intersect with the scan-line of interest are left as the active edge list 900. Active edges in the active edge list 900 are sorted based on X-coordinates (integers: indicated by X1, X2, . . . in FIG. 9B) of intersections between the scan-line and vector edges. The sorted result corresponds to a view 1120 in FIG. 9B. In FIG. 9B, x1, x2, . . . represent the real number x-coordinates of intersections, and in FIGS. 9A and 9B, (1) to (4) represent level numbers (Level).

Next, the active edges in the active edge list 900, which are sorted in the X-coordinate order of intersections are level-sorted to create a span list 1000 (to be described later with reference to FIG. 17) on a memory. Reference numeral 1130 denotes a view showing manipulations of a level sort stack 800 (to be described later with reference to FIG. 18) on the memory during level sorting. The level sort stack is manipulated according to the processing rules to be described later with reference to FIGS. 21A and 21B. In the view 1130, "push" represents push-in to the level sort stack 800, "pop" represents extraction from the level sort stack 800, "remove" represents deletion, and "sort" represents sorting in descending order of level.

A view 1140 in FIG. 9B shows the span list 1000 generated as a result of level sorting.

Then, referring to FIGS. 10A and 10B, write accesses to pixels 1170 for one scan-line in the page spool buffer 1301 in FIG. 8B are executed based on the span list 1140 in accordance with processing rules shown in FIGS. 22A, 22B, 25A and 25B to be described later. Then, color values and image area flags of all pixels of one scan-line are determined. Views 1150 and 1160 respectively show examples of the level list 700 and fill table 430 used in this case.

(Resolution Control Example in Rectangle Area of this Embodiment)

Figure 12:
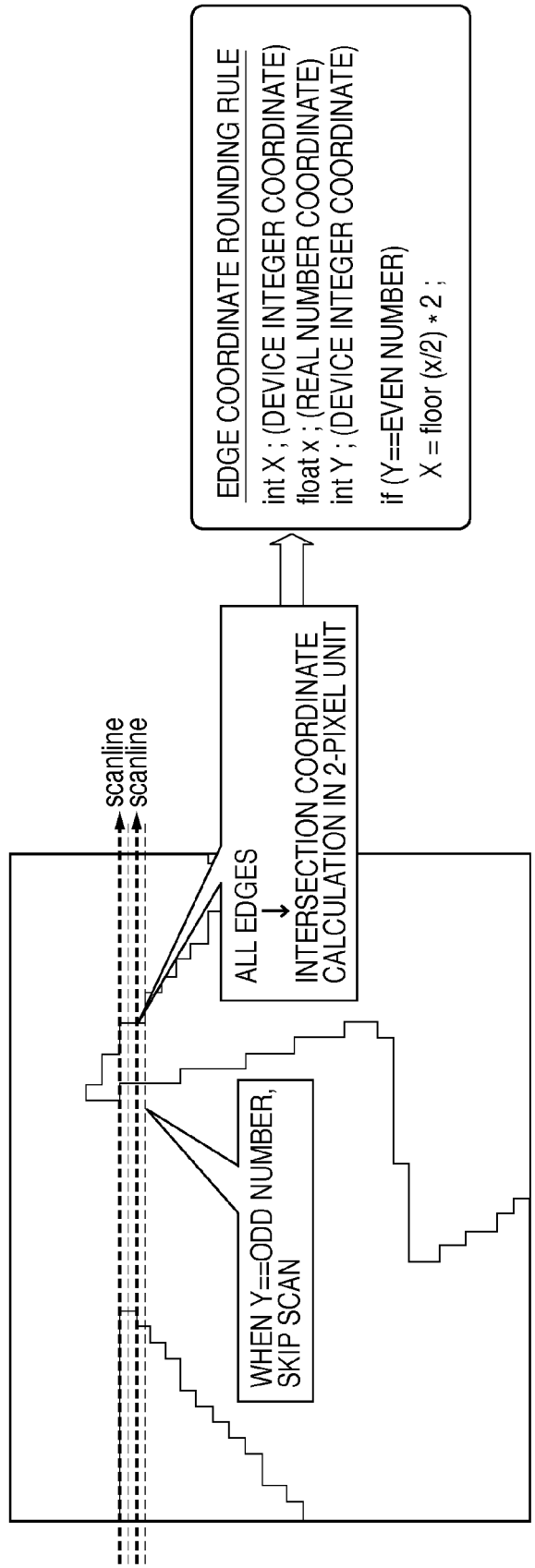
FIG. 12 is a pattern diagram showing a part of drawing processing only for a low-resolution portion.

FIGS. 11 and 12 are pattern diagrams for explaining the concept of conversion processing to integer coordinate values in the rectangle area drawing processing.

FIG. 11 shows the concept of a state in which the 1200-dpi quality is attained in a one-pixel unit for S and L edges, and the 600-dpi quality is attained in a plural-pixel unit for other edges as a result of drawing in the sequences of processing shown in FIGS. 19A, 19B, 20A and 20B to be described later.

FIG. 12 shows the concept of a state in which the 600-dpi quality is attained in a plural-pixel unit in processing of a packet DL which includes neither an S edge nor an L edge as a result of drawing in the sequences of processing shown in FIGS. 23A, 23B and 24 to be described later.

(Pattern Diagrams of Resolution Control of this Embodiment)

Figure 13:
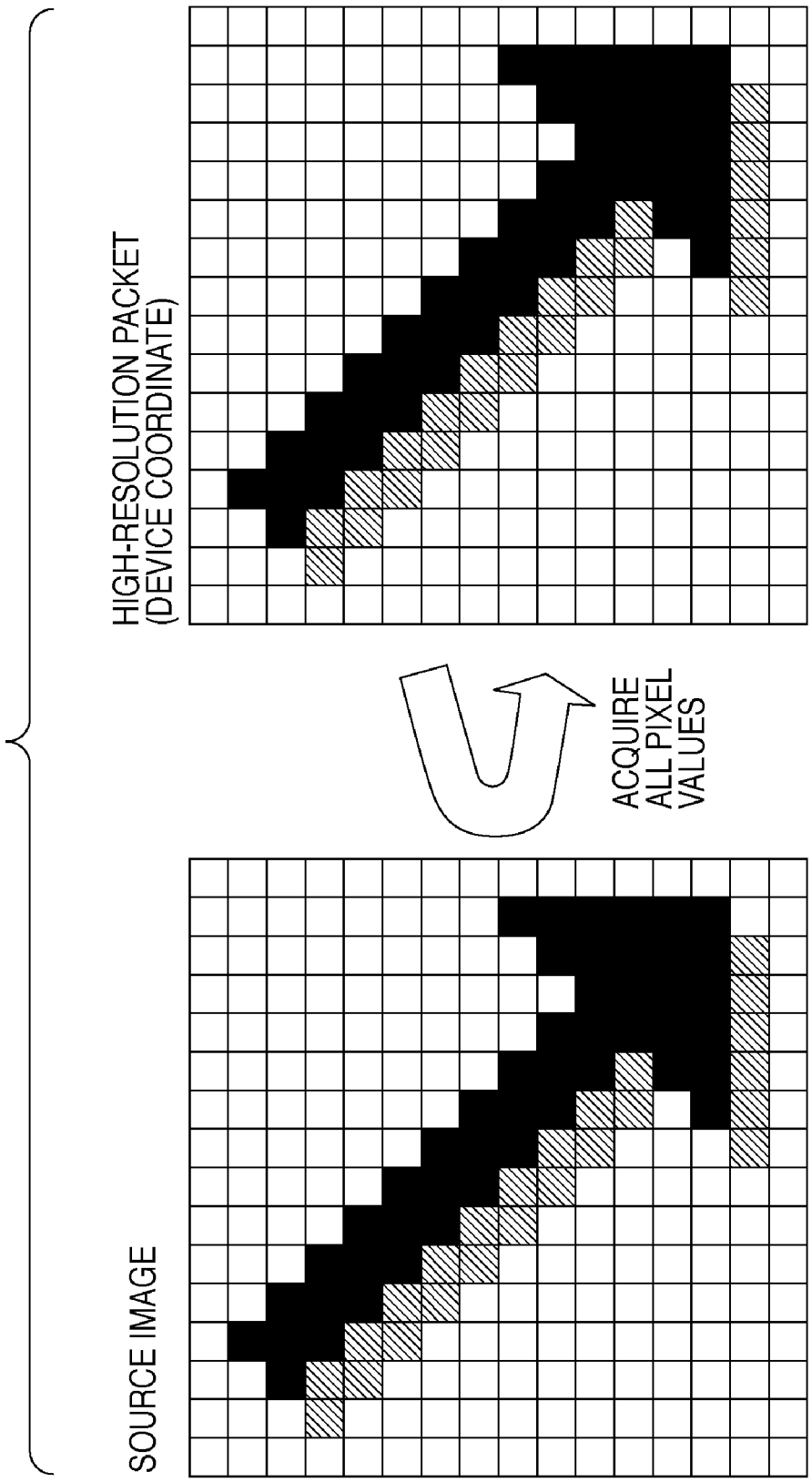
FIG. 13 is a pattern diagram showing a part of drawing processing for a high-resolution portion.
Figure 14:
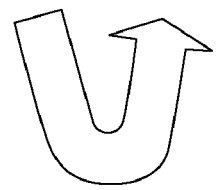
FIG. 14 is a pattern diagram showing a part of drawing processing for a low-resolution portion.

FIGS. 13 and 14 are pattern diagrams of resolution control of this embodiment.

In FIG. 13, processing is executed for all pixel positions to attain drawing to have the 1200-dpi quality, thus achieving a high resolution.

On the other hand, in FIG. 14, in order to achieve drawing with the 600-dpi quality, enlarging pixel processing is executed by applying processing to only pixel positions that assume even numbers in X- and Y-coordinates, thus achieving a low resolution.

<Processing Sequence Example of Controller Section of this Embodiment>

An example of the processing sequence of the controller unit 100 which implements drawing of this embodiment will be described in detail below with reference to the flowcharts. Note that a principal functional module that implements drawing of this embodiment is the data drawing module 33 including the RIP 111.

(Data Structure Example of Work Memory Used by RIP)

Figure 15:
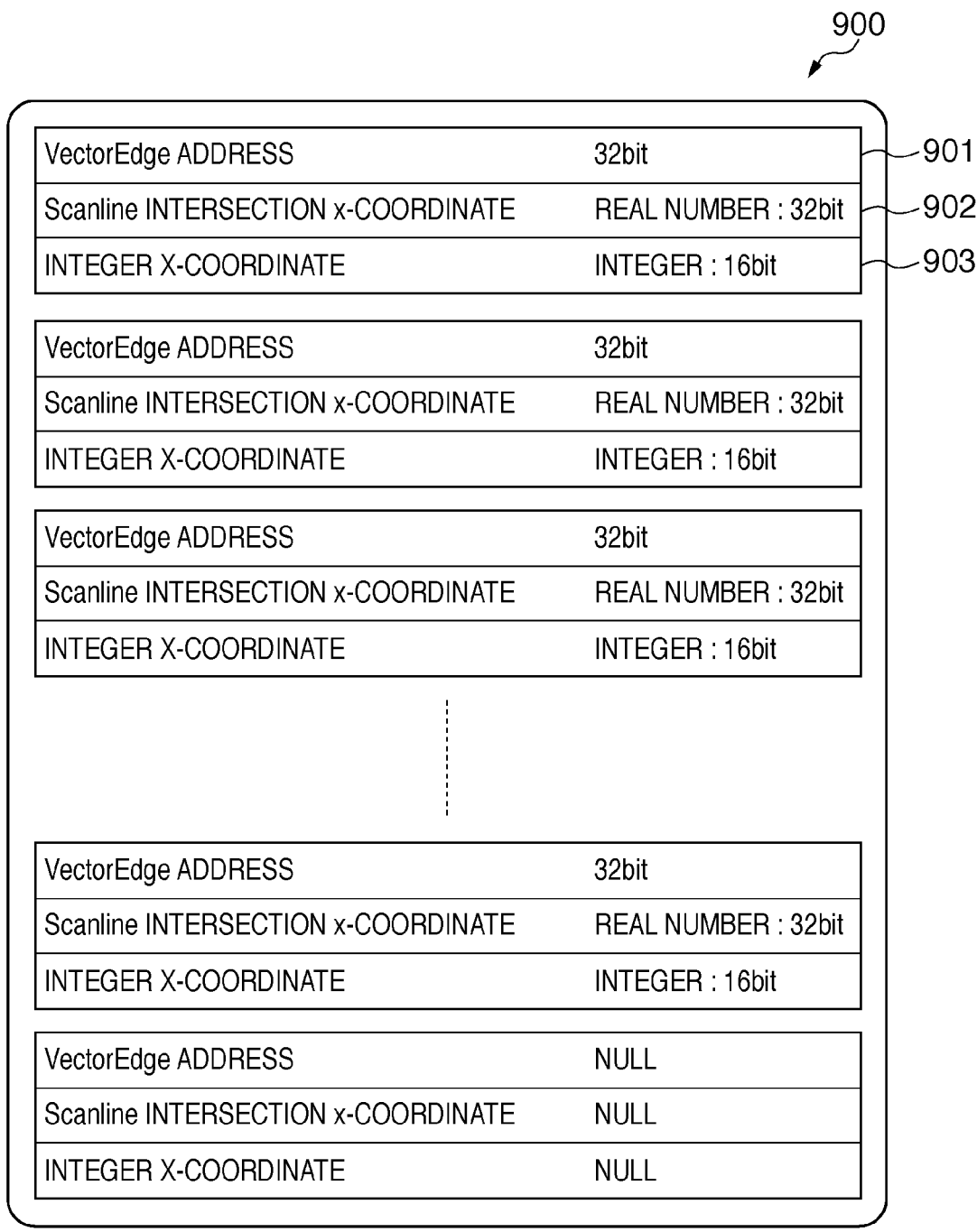
FIG. 15 is a view showing an example of the data configuration of an active edge list according to this embodiment.
Figure 17:
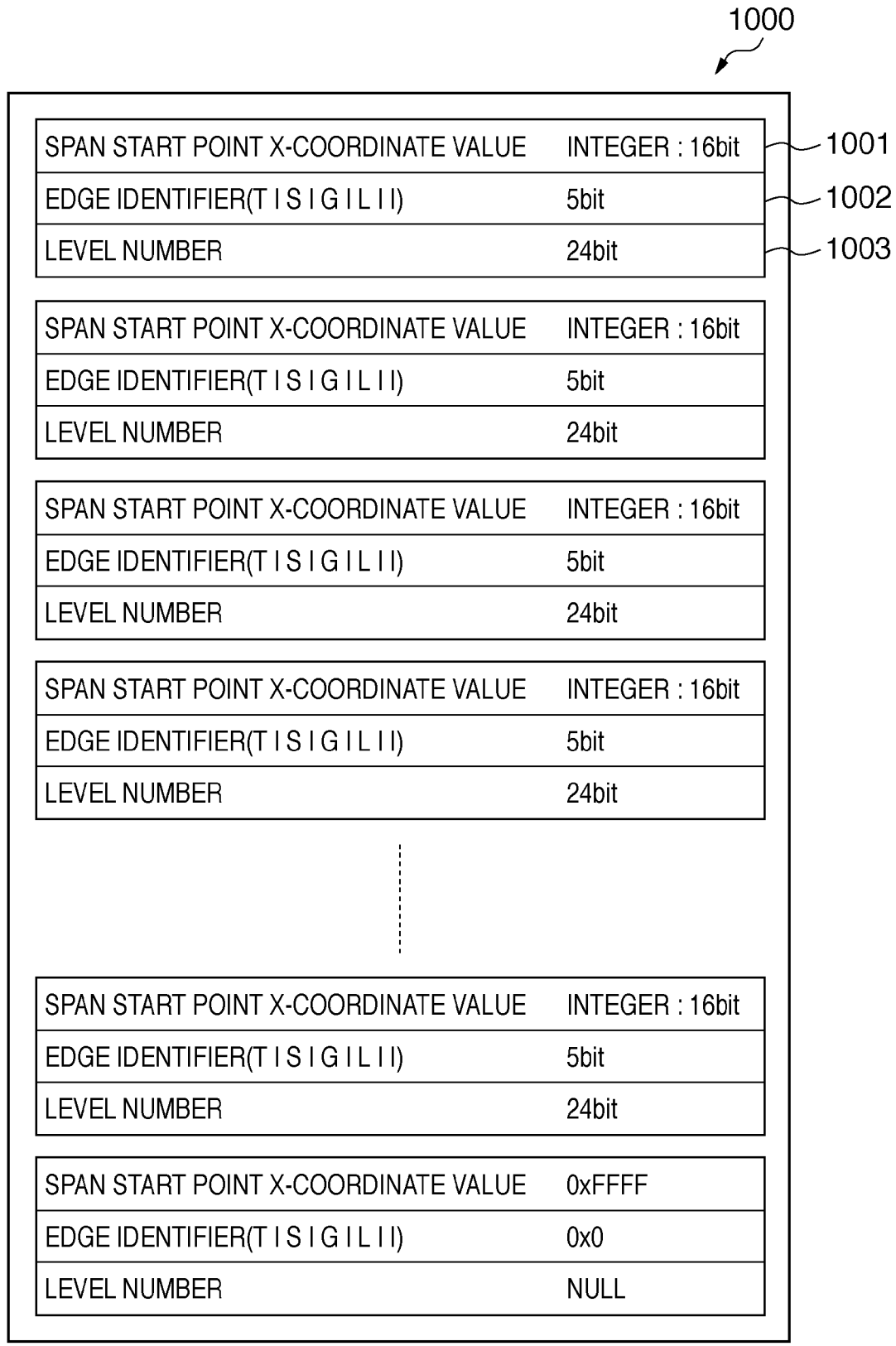
FIG. 17 is a view showing an example of the data configuration of entries of a span list according to this embodiment.

FIGS. 15 to 17 show an example of the data structure of a work memory used by the RIP 111 upon execution of drawing. Such work memory may be allocated in the RIP 111 or may use the image memory 116 or RAM 102.

FIG. 15 shows the active edge list 900, which is generated based on one packet DL 500 (see FIG. 5) of the display list 400 in FIG. 4, and includes active edges having intersections with a scan-line of interest in one rectangle area.

The active edge list 900 includes active edges having intersections with the scan-line of interest. Each active edge has a vector edge address 901 used to refer to a vector edge (indicated by the edge identifier (T, S, G, L, or I) 515 and level number (Level) 516 in FIG. 5). Also, each active edge has a scan-line intersection x-coordinate 902 which represents an intersection with the scan-line of interest as a real number, and an integer X-coordinate 903 that represents an integer part of the scan-line intersection x-coordinate 902.

FIG. 16 shows an example of the level sort stack 800 used to level-sort the active edge list 900 sorted based on X-coordinates in turn.

Each stack of the level sort stack 800 stores a level number 801, edge identifier 802, and remove flag 803 indicating execution of "remove". A stack in which the remove flag 803 is set is indicated by hatching in the level sort stack 1130 in FIG. 9B described above.

FIG. 17 is a view showing the span list 1000 including most upper level stack data as a result of level sorting using the level sort stack 800 in FIG. 16.

Each span in the span list 1000 includes a span start X-coordinate value 1001, edge identifier 1002, and level number 1003. The span list 1000 corresponds to the span list 1140 shown in FIGS. 9B and 10A.

<Overall Processing Sequence Example of Packet DL Rendering of This Embodiment>

FIG. 18 is a flowchart showing an example of the sequence of packet DL rendering processing of this embodiment. Of the processes shown in FIG. 18, steps S1405 and S1406 are processes executed in the RIP 111. The RIP 111 includes a processor and memory, and executes a program recorded in advance in the memory. In this embodiment, the memory records a program required to implement the processes in steps S1405 and S1406. Also, a work memory which temporarily stores the data shown in FIGS. 15 to 17 above may be allocated in the RIP 111.

Other steps in FIG. 18 are executed by the CPU 101 after a program, which is stored in the HDD 104 in the controller unit 100 and implements the data drawing module 33, is loaded onto the RAM 102. The overall processing example upon execution of FIG. 18 has already been generally described according to the pattern diagram of the overall operation of the packet DL rendering processing in FIGS. 8A-8C.

In step S1401, the CPU 101 starts interpretation of the display list 400 received from the network I/F 30. In the description of this embodiment, assume that the display list 400 is generated on the host computer 41.

In step S1402, the CPU 101 switches processes in correspondence with instructions in the display list 400 ("Switch" in FIG. 18).

In case of the <SET_LEVELLIST> instruction 401, the CPU 101 stores the level list address 402 in the display list 400 in the memory in the RIP 111 in step S1408. This address is referred to as the start address of the level list 700 in the processing of the RIP 111.

In case of the <SET_FILLTABLE> instruction 403, the CPU 101 stores the fill table address 404 in the display list 400 in the memory in the RIP 111 in step S1409. This address is referred to as the start address of the fill table 430 in the processing of the RIP 111.

In case of the <DECOMPRESS_IMAGE> instruction 405, the CPU 101 expands the compressed image data 410 referred to by its image address 406 onto the decompression image buffer 420 in step S1407. The compression format of the compressed image data 410 uses JPEG or JBIG.

In case of the <RENDER_PACKET> instruction 407, the CPU 101 acquires the packet DL 500 referred to by the packet DL address 408 from the display list 400 in step S1403. The packet DL address 408 is stored in the memory in the RIP 111, and is referred to by the RIP 111 as the start address of the packet DL 500. Furthermore, the CPU 101 checks the numbers 506 to 510 of various edges included in the packet DL 500 to confirm the presence/absence of an S or L edge.

If an S or L edge is included, the CPU 101 instructs the RIP 111 to render drawing objects represented by the S and L edges at a resolution of 1200 dpi in step S1405 in the processes of the RIP 111. Drawing objects represented by other edges are rendered to have quality corresponding to a resolution of 600 dpi.

If neither an S edge nor an L edge is included, the CPU 101 instructs the RIP 111 to render all drawing objects to have quality corresponding to a resolution of 600 dpi in step S1406 in the processes of the RIP 111.

One rendered pixel includes respective pieces of color value information of r, g, and b, and an image area flag, as described above using the pixels 1170 in FIG. 10B.

The rendering result is stored in the page spool buffer 1301 for each rectangle area specified by the packet DL 500, and coordinate value information (represented by the start point coordinates, and a height and width), and resolution quality information are appended, as shown in FIG. 8B. The resolution quality when an S or L edge is included is recorded as 1200 dpi or 600 dpi, and that when neither an S edge nor an L edge is included is recorded as 600 dpi.

In case of the <END_PAGE> instruction 409, the CPU 101 detects that the rendering processing of the display list 400 is to end, thus ending the interpretation processing of the display list 400. In step S1410, the CPU 101 transfers an image in the page spool buffer 1301 onto the page memory 34. In this case, as described above using FIGS. 11 to 14, an image of a rectangle area rendered to have the 600-dpi quality is expanded on the page memory at a 2× scaling factor. On the other hand, an image of a rectangle area rendered to have the 1200- or 600-dpi quality is expanded to be non-scaled.

<Processing Sequence Example of Mixed-Resolution Rendering S1405 by RIP 111>

Figure 19A:
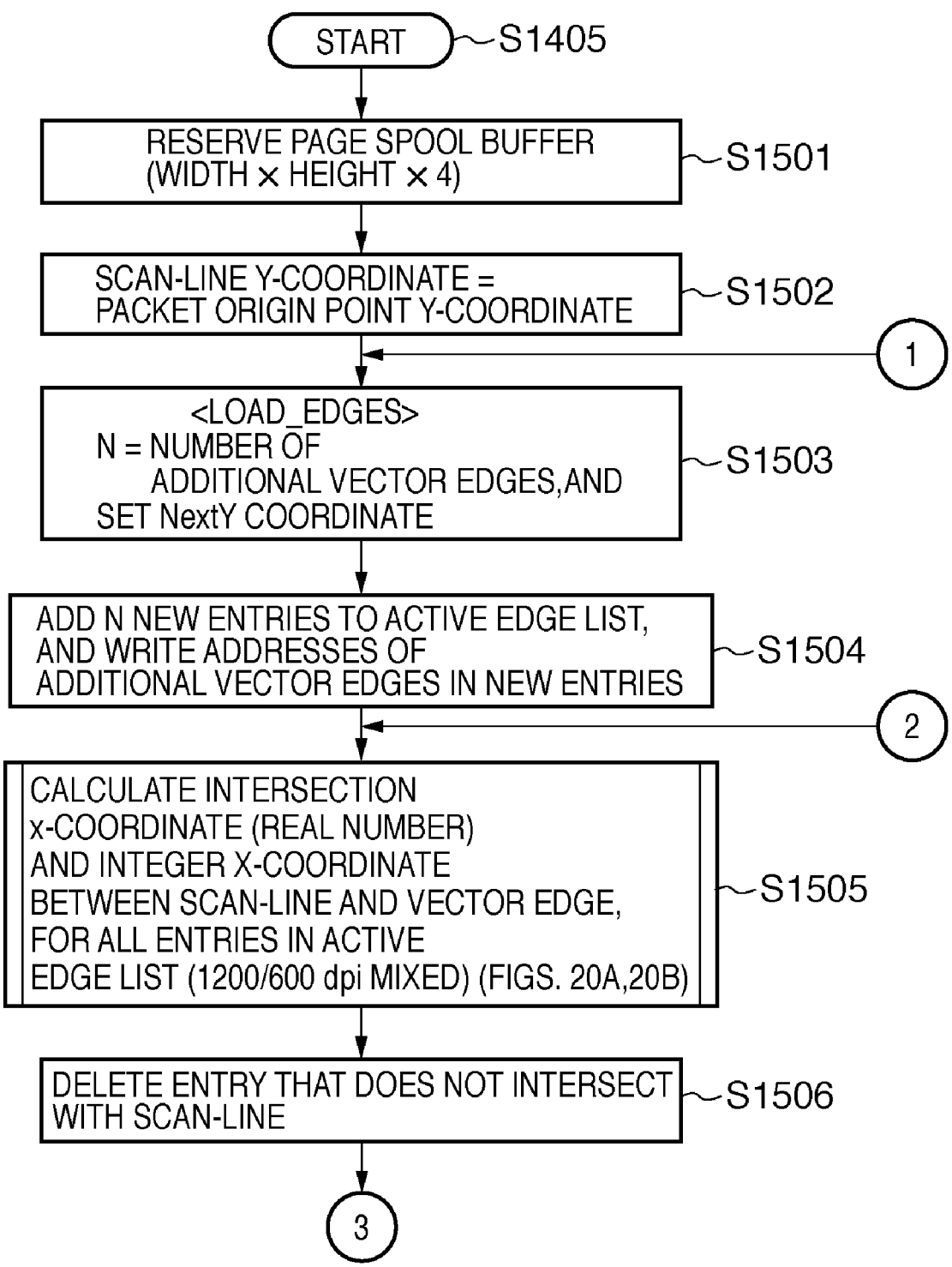
FIGS. 19A and 19B are flowcharts showing an example of the sequence of detailed processing in step S1405 in FIG. 18.
Figure 19B:
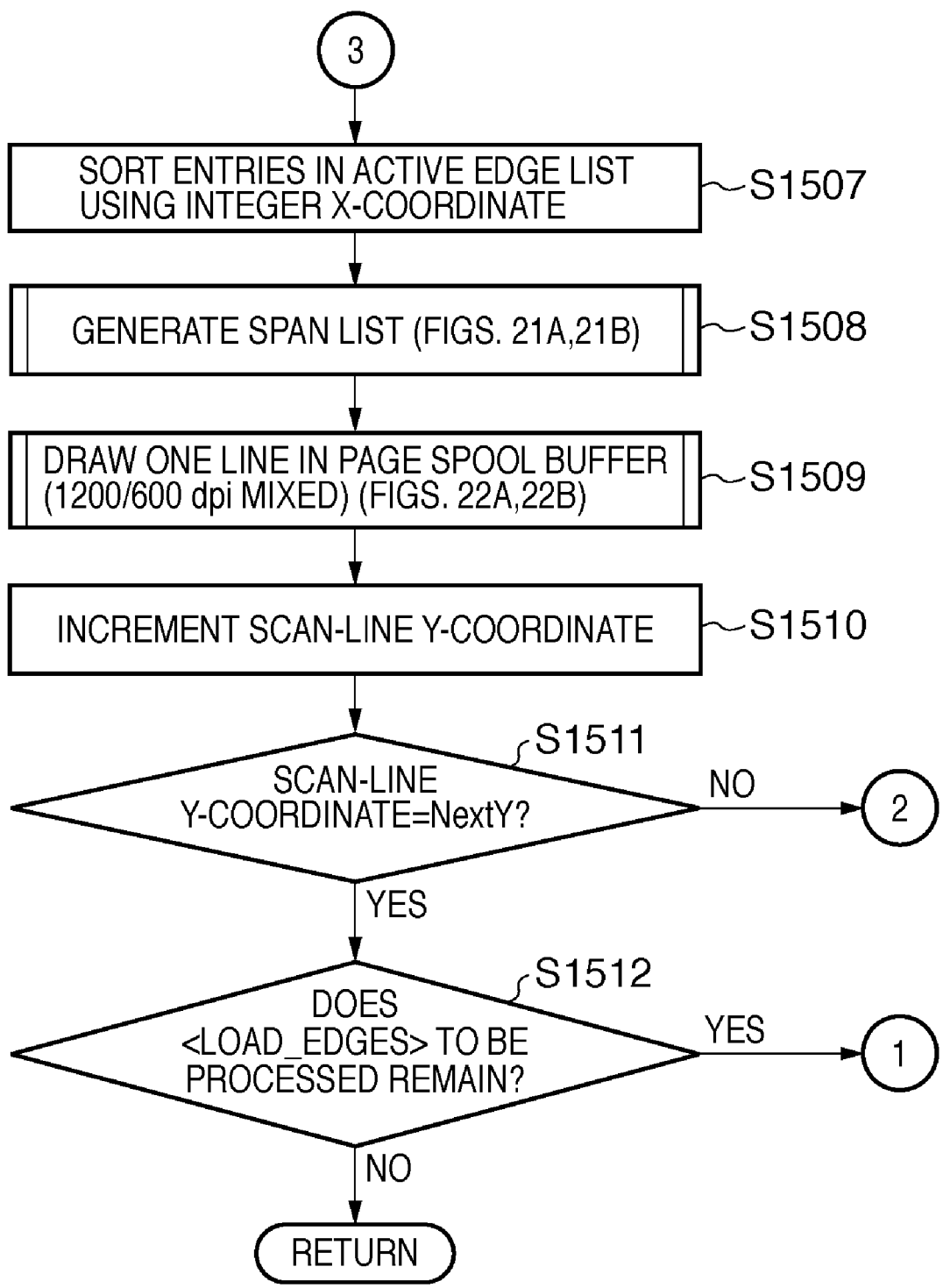

FIGS. 19A and 19B are flowcharts showing an example of the sequence of the detailed drawing processing by the RIP 111 when the resolutions are mixed in step S1405 in FIG. 18. A CPU in the RIP 111 executes this processing.

In step S1501, the RIP 111 determines a required size of the page spool buffer 1301 (see FIG. 8B) based on information of the packet area height 504 and packet area width 505 in the packet DL 500, and reserves the required size of the page spool buffer 1301. An image size of one rectangle area is determined by width×height×(bit-depth of color value+bit-count of image area flag). Subsequently, the RIP 111 starts rendering processing of a scan-line of interest (see FIGS. 9A, 9B, 10A and 10B).

In step S1502, the RIP 111 sets a Y-coordinate of the scan-line to be rendered as the origin point Y-coordinate value 502 of the packet DL 500.

In step S1503, the RIP 111 reads the instruction <LOAD_EDGES> 511 in the packet DL 500, and writes the number 512 of additional edges recorded as a set with the instruction in a variable N. Also, the RIP 111 writes the NextY coordinate 513 in a variable NextY. In step S1504, the RIP 111 assures an area of the active edge list 900 as an area used to manage information of edges to be processed (see FIG. 15). The active edge list 900 is a list of the data structures that hold information required to draw vector edges during rendering of the scan-line, and memory areas corresponding to the number N of additional edges are added in step S1504. Furthermore, the RIP 111 writes the vector edge addresses 901 in the added memory areas. Each vector edge address 901 is an address required to refer to a set of the vector segment address 514, edge identifier 515, and level number 516 in the packet DL (see FIG. 5).

In this stage, all pieces of information of vector edges which intersect with the scan-line specified by the Y-coordinate are stored in the active edge list 900.

Subsequently, in step S1505 the RIP 111 calculates all logical intersection x-coordinates (real number values) 902 between the scan-line of interest and vector edges, and stores the calculated coordinates in correspondence with the vector edge addresses 901 in the active edge list 900. Furthermore, the RIP 111 also calculates the X-coordinate values (integer values) 903 to be drawn as the rendering result, and stores them in correspondence with the vector edge addresses 901. Details of the intersection coordinate calculation processing will be described later using FIGS. 20A and 20B.

Based on the result of the coordinate calculation processing, in step S1506 the RIP 111 deletes information associated with the vector edges which are determined not to intersect with the scan-line from the active edge list 900. Furthermore, in step S1507 the RIP 111 sorts sets of vector edge information in the active edge list 900 in ascending order using the integer X-coordinate value.

Figure 10A:
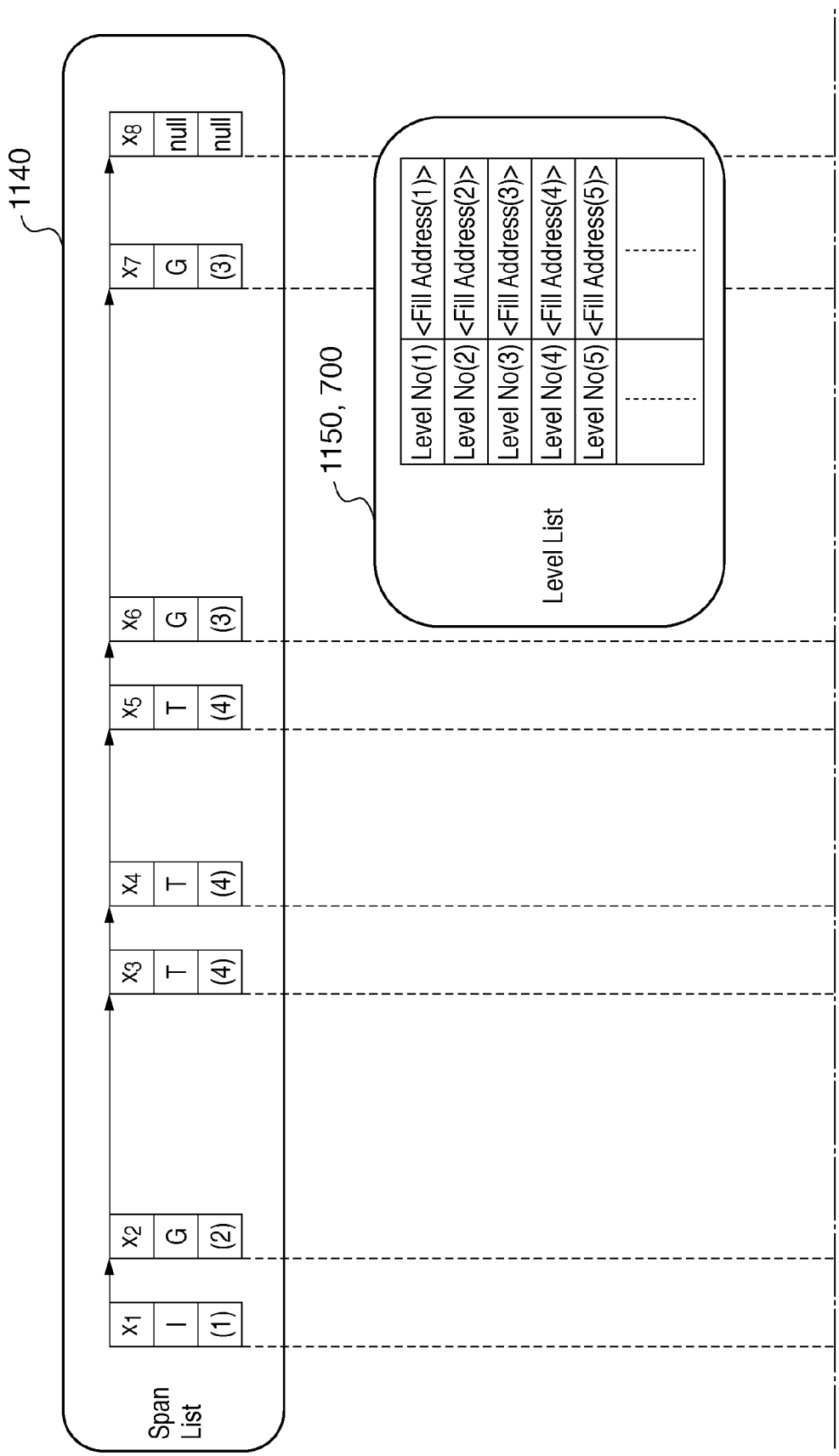
FIGS. 10A and 10B are pattern diagrams for explaining the internal operation upon execution of rendering of a scan-line according to this embodiment.

In step S1508, the RIP 111 generates the span list 1000 (see the views 1120 to 1140 in FIGS. 9B and 10A). A plurality of pieces of span information is stored in the span list 1000. Each span information includes three pieces of information, that is, the span start point X-coordinate value 1001, edge identifier 1002, and level number 1003, as described above using FIG. 17. Details of the span list generation processing will be described later using FIGS. 21A and 21B.

Figure 10B:
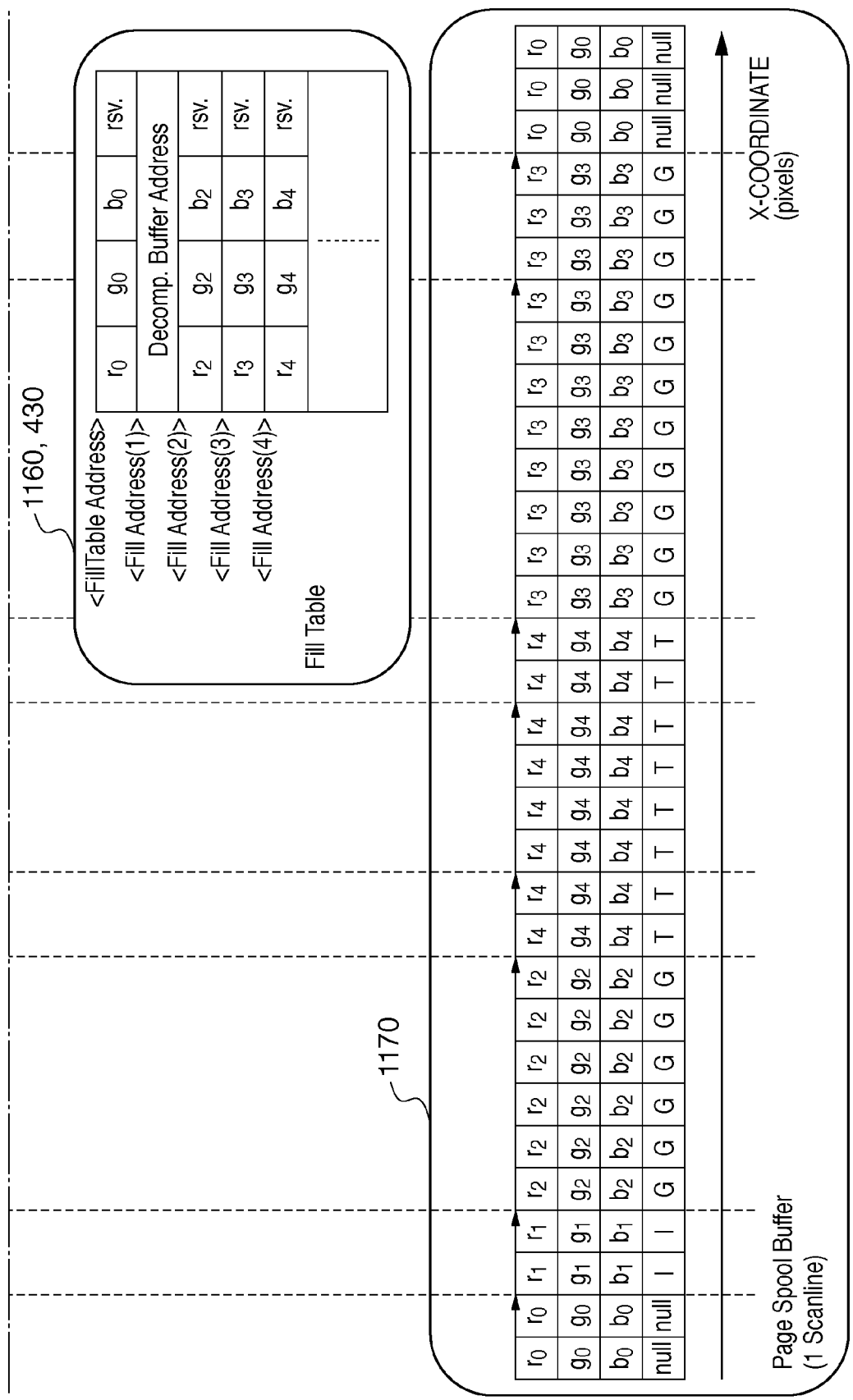

In step S1509, the RIP 111 draws one scan-line on the page spool buffer 1301 using the span list 1000 (see the views 1140 to 1170 in FIGS. 10A and 10B). Details of the processing in step S1509 will be described later using FIGS. 22A and 22B.

With the processes described so far, drawing processing for one scan-line in a rectangle area defined by the packet DL is complete. The RIP 111 increments the Y-coordinate value of the scan-line of interest in step S1510, and compares the incremented Y-coordinate value with the variable NextY in step S1511. If the scan-line Y-coordinate does not match the variable NextY, the process returns to step S1505, and the RIP 111 continues to process the next scan-line.

If the scan-line Y-coordinate matches the variable NextY, it indicates that the <LOAD_EDGES> instruction starting from step S1503 ends. If a <LOAD_EDGES> instruction to be processed still remains in step S1512, the process returns to step S1503, and the RIP 111 continues to execute addition processing of new vector edges. Upon completion of the processing of all <LOAD_EDGES> instructions, the RIP 111 ends the packet DL rendering processing in step S1405, and returns the processing to the CPU 101.

(Sequence Example of Intersection Calculation S1505 Between Scan-Line and Vector Edge)

Figure 20A:
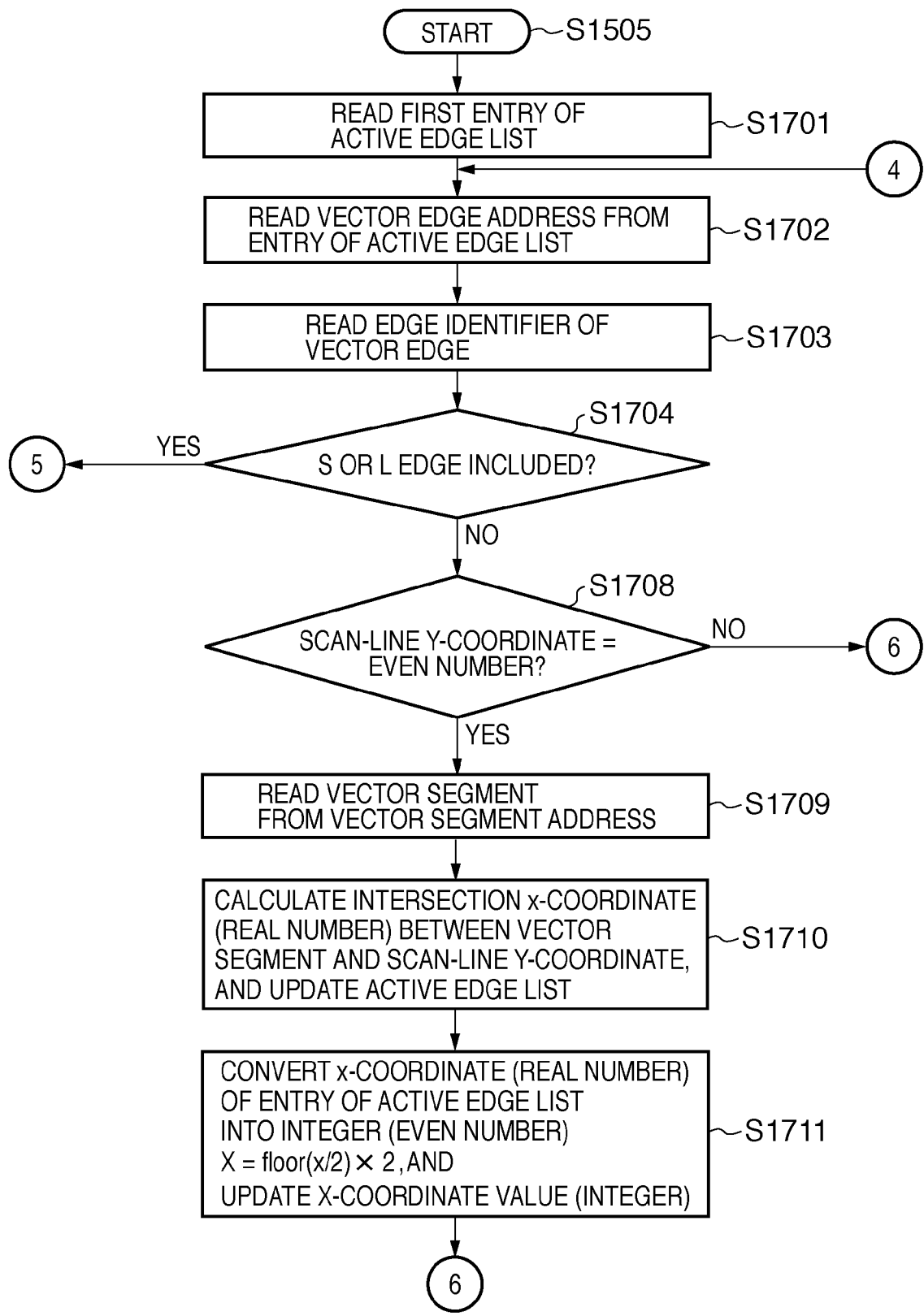
FIGS. 20A and 20B are flowcharts showing an example of the sequence of detailed processing in step S1505 in FIG. 19A.
Figure 20B:
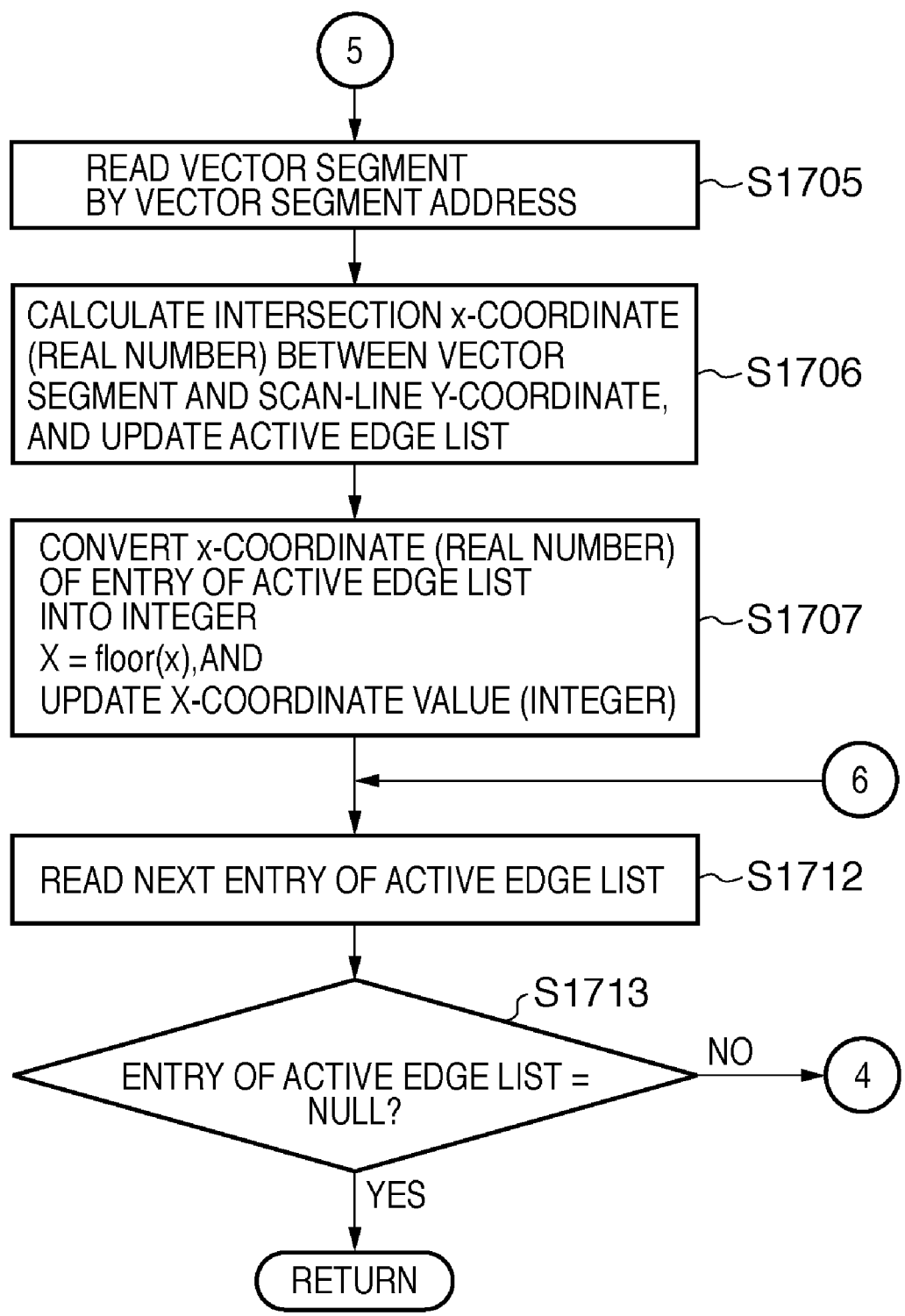

FIGS. 20A and 20B are flowcharts for explaining details of the calculation processing of the intersections between the scan-line and vector edges for the active edge list 900 in step S1505 in FIG. 19A.

In step S1701, the RIP 111 reads a set of edge information located at the head of the active edge list 900. The RIP 111 reads the vector edge address 901 in step S1702, and reads the edge identifier 515 from vector edge information referred to by that vector edge address 901 in step S1703.

The RIP 111 checks in step S1704 if the edge identifier indicates an S or L edge.

If the edge identifier indicates an S or L edge, the RIP 111 executes processing for rendering that edge to have the 1200-dpi quality. In step S1705, the RIP 111 reads a vector segment referred to by the vector segment address 514. The RIP 111 then calculates an intersection x-coordinate between the vector segment and scan-line Y-coordinate in step S1706. At this time, the RIP 111 calculates the x-coordinate value as a real number, and updates the scan-line intersection x-coordinate value 902 in the active edge list 900. Furthermore, in step S1707, the RIP 111 converts the x-coordinate value (real number) into an integer, and updates the integer X-coordinate 903. Conversion to an integer is attained by truncating a decimal part as follows.

$$X = \text{floor}(x)$$

If the edge identifier indicates neither an S edge nor an L edge, the RIP 111 executes processing for rendering that edge to have the 600-dpi quality. The RIP 111 checks in step S1708 if the currently processed scan-line Y-coordinate value assumes an even or odd number. If the scan-line Y-coordinate value assumes an odd number, the RIP 111 skips the intersection coordinate calculation, and the process jumps to step S1712. If the scan-line Y-coordinate value assumes an even number, the RIP 111 reads a vector segment referred to by the vector segment address 514 in step S1709. Next, the RIP lll calculates an intersection x-coordinate between the vector segment and scan-line Y-coordinate in step S1710. At this time, the RIP 111 calculates an x-coordinate value as a real number, and updates the scan-line intersection x-coordinate value 902 in the active edge list 900. Furthermore, the RIP 111 converts the x-coordinate value (real number) into an integer in step S1711 to update the integer X-coordinate 903. Conversion into an integer is attained by rounding the real number to a smaller even number as follows.

$$X = \text{floor}(x/2) \times 2$$

After the X-coordinate calculation, the RIP 111 reads the next set of edge information in the active edge list 900 in step S1712. If the read value is a NULL value, the RIP 111 determines in step S1713 that no next edge exists, and ends the processing to return to the previous routine. If the next edge information exists, the RIP 111 returns the process to step S1702.

(Sequence Example of Span List Generation S1508/S1608)

Figure 21A:
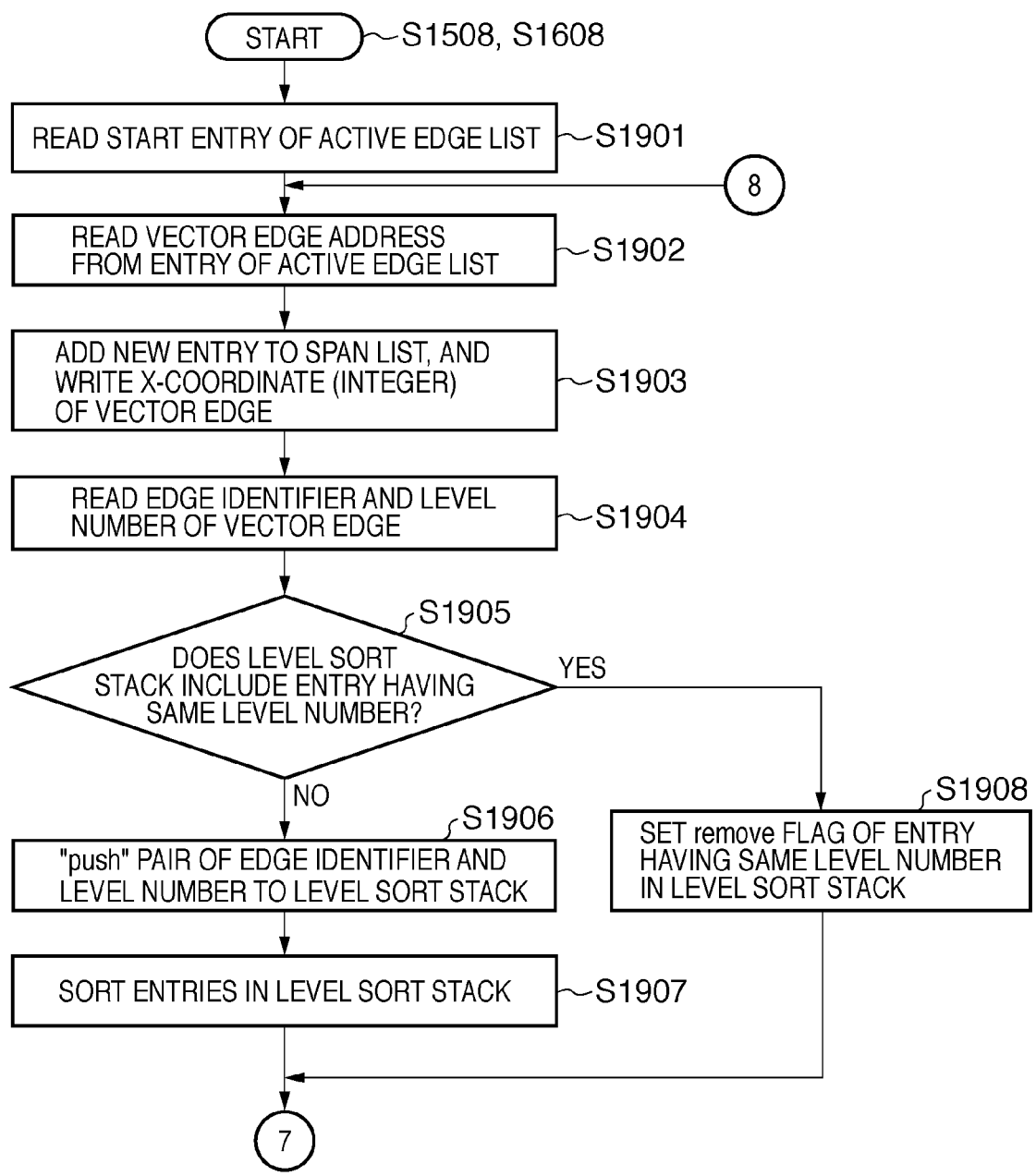
FIGS. 21A and 21B are flowcharts showing an example of the sequence of detailed processing in step S1508 in FIG. 19B and step S1608 in FIG. 23B.
Figure 21B:
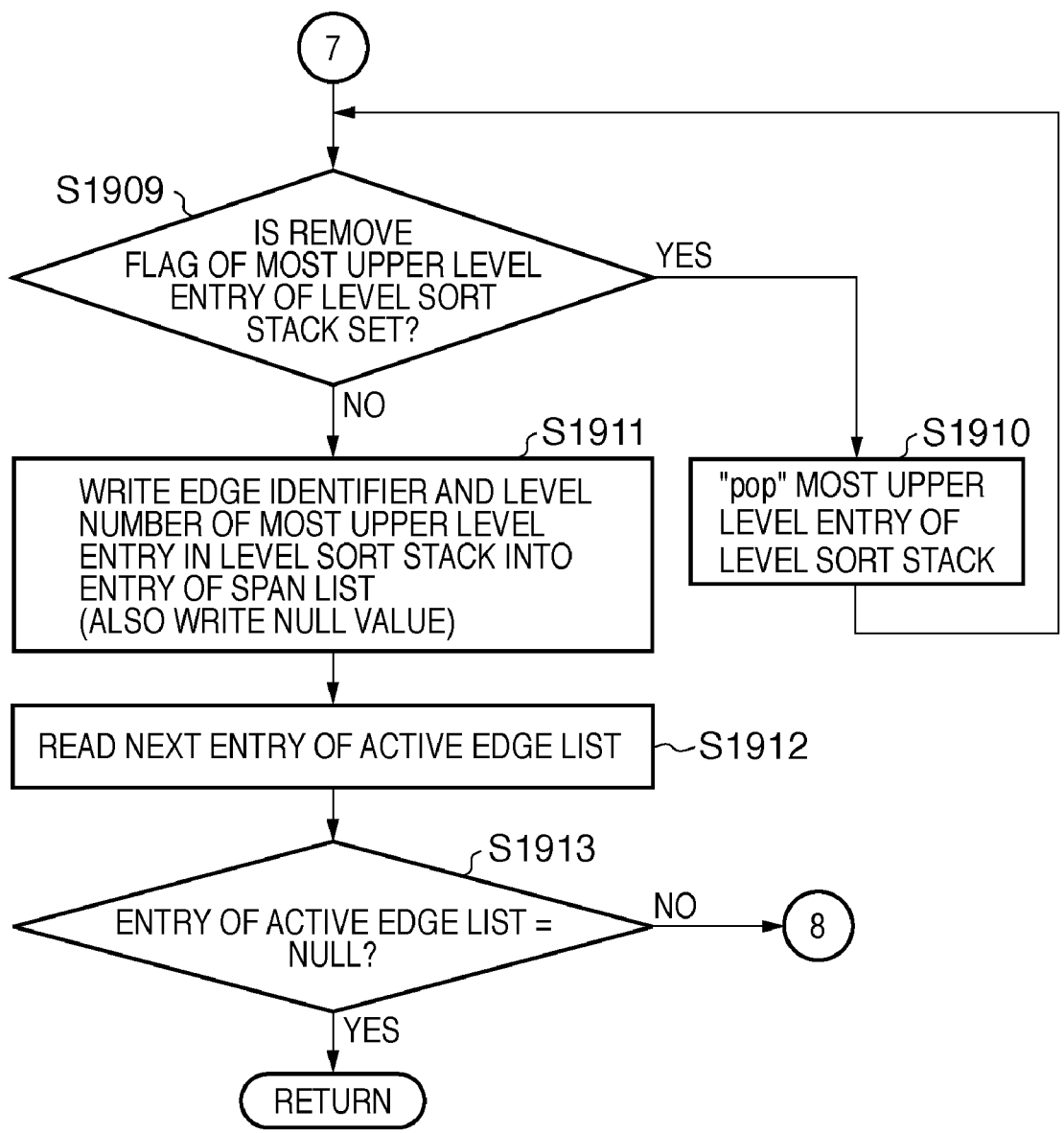

FIGS. 21A and 21B are flowcharts for explaining details of the span list generation processing based on the active edge list 900 in step S1508 in FIG. 19B and step S1608 in FIG. 23B (to be described later). Refer to the views 1120 to 1140 in FIG. 9B above.

In step S1901, the RIP 111 reads a set of edge information located at the head in the active edge list 900 in FIG. 15. In step S1902, the RIP 111 then reads the vector edge address 901 and integer X-coordinate 903 from the active edge list 900. In step S1903, the RIP 111 adds an entry for a new span to the span list 1000, and writes the integer X-coordinate value 903 in the span start point X-coordinate value 1001. In step S1904, the RIP 111 reads the edge identifier 515 and level number 516 of a vector edge referred to by the vector edge address 901.

In step S1905 and subsequent steps, the RIP 111 executes processing for a work memory area used to manage level information. This work memory area will be referred to as a level sort stack (see FIG. 16 and the view 1130 in FIG. 9B). One entry of the level sort stack 800 includes three pieces of information, that is, the level number 801, edge identifier 802, and remove flag 803, as described above using FIG. 16.

The RIP 111 confirms in step S1905 if the level sort stack 800 includes an entry having the same level number as that read in step S1904.

If no entry having the same level number is found, it indicates that the edge is located at the left end position of a certain object in the scan-line of interest. In step S1906, the RIP 111 writes the level number 801 and edge identifier 802 in the new entry of the level sort stack 800, resets the value of the remove flag to zero, and executes "push" to the level sort stack 800. Then, the RIP 111 sorts ("sort") the level sort stack 800 so that entries with larger level numbers are located at upper positions in step S1907.

If it is determined in step S1905 that an entry having the same level number is found, it indicates that the edge is located at the right end position of a certain object in the scan-line of interest. The RIP 111 changes the value of the remove flag to 1 ("remove") to the entry having the same level number in the level sort stack 800 in step S1908.

In step S1909, the RIP 111 confirms the value of the remove flag of the most upper level entry in the level sort stack 800. If the value of the remove flag is 1, the RIP 111 executes "pop" of the most upper level entry of the level sort stack 800 in step S1910, and the process returns to step S1909.

If the value of the remove flag is 0, the RIP 111 writes the values of the level number 801 and edge identifier 802 of the most upper level entry in the level sort stack 800 into the edge identifier 1002 and level number 1003 of the span list 1000 in step S1911.

In step S1912, the RIP 111 reads the next entry of the active edge list 900. If information in this entry is a NULL value, the RIP 111 determines in step S1913 that the processing of all entries in the active edge list is complete, and ends the span list generation processing to return to the previous routine. If the entry includes values other than the NULL value, the process returns to step S1902 to continue the next edge processing.

(Sequence Example of One-Line Write S1509 in Page Spool Buffer)

Figure 22A:
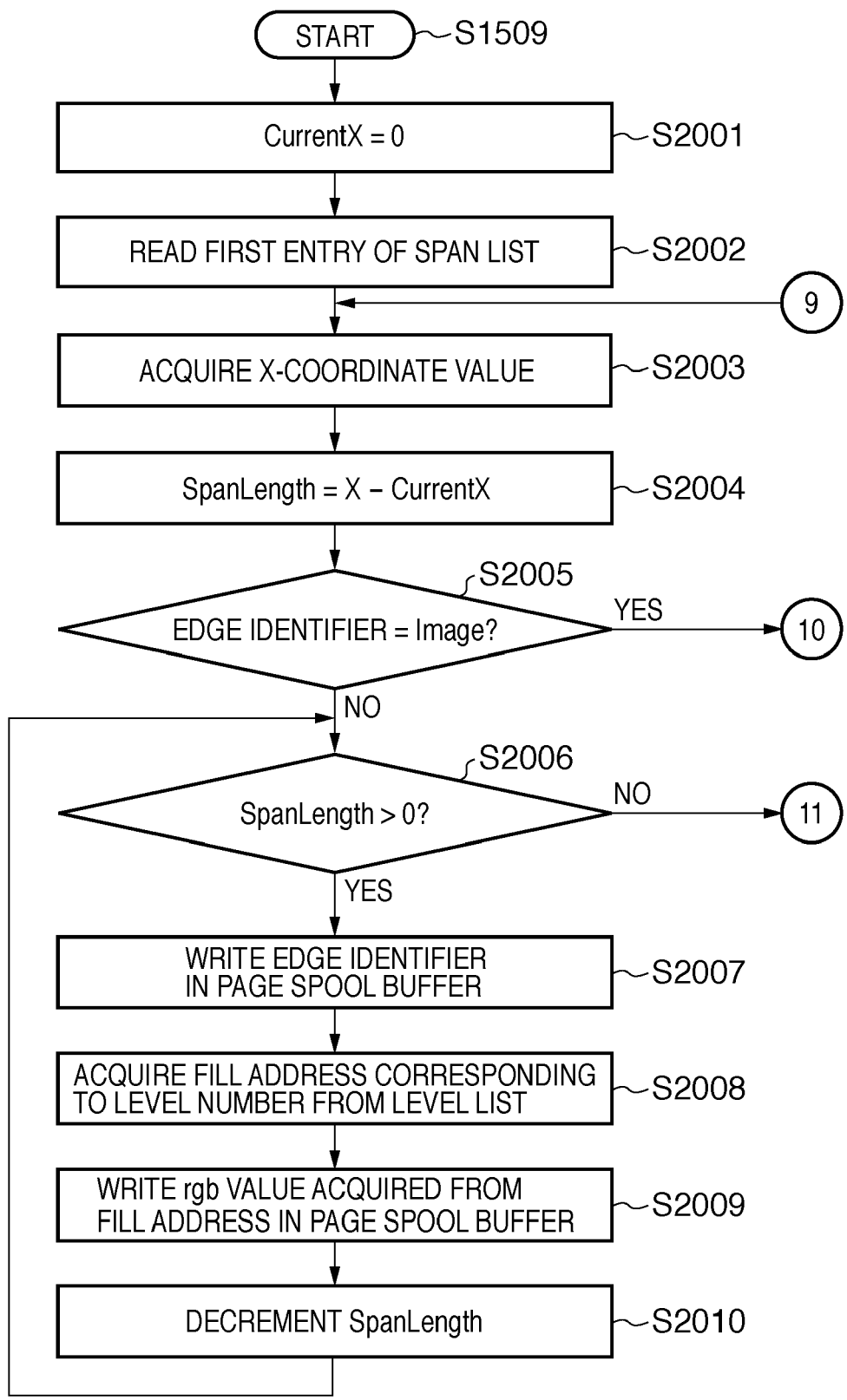
FIGS. 22A and 22B are flowcharts showing an example of the sequence of detailed processing in step S1509 in FIG. 19B.
Figure 22B:
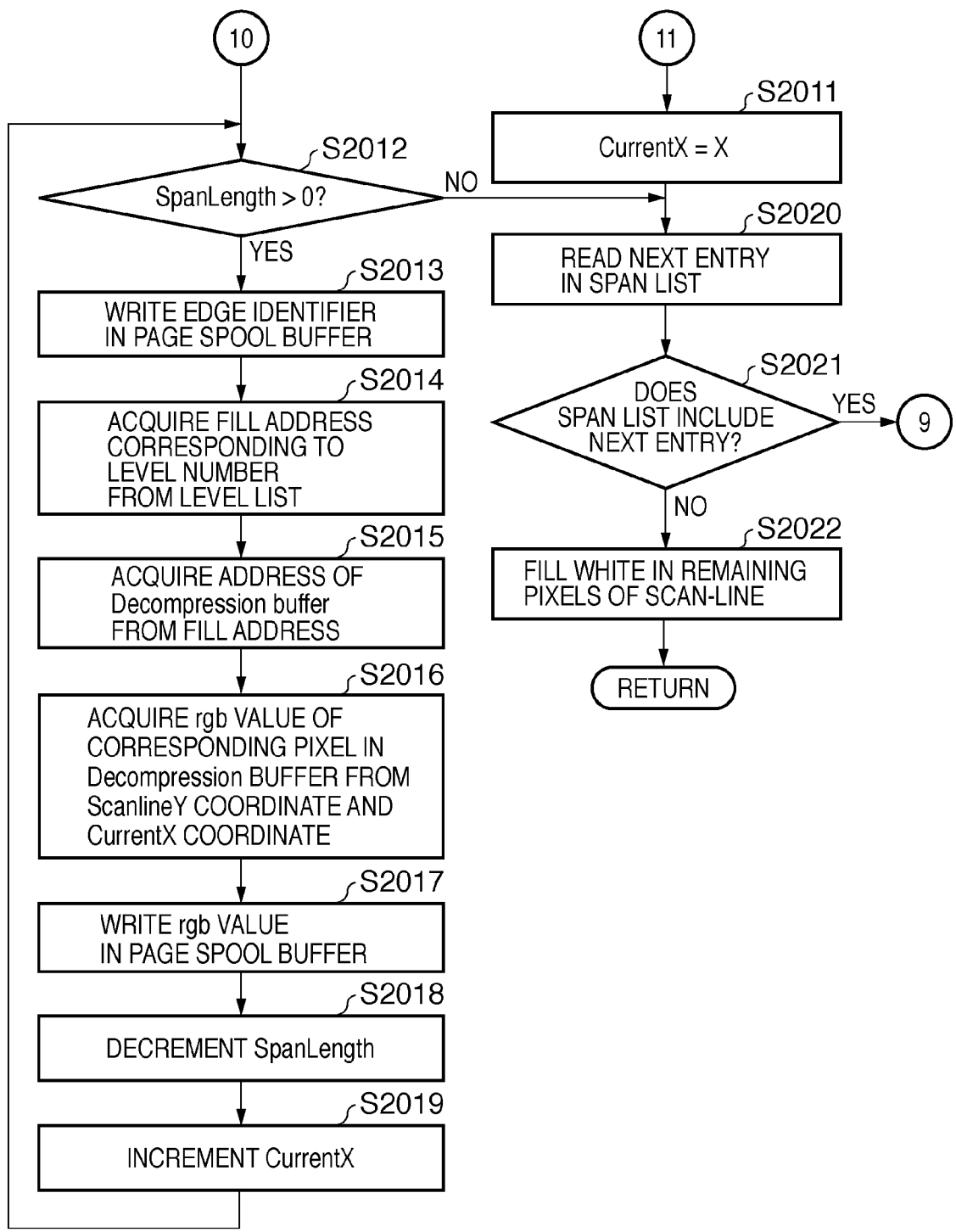

FIGS. 22A and 22B are a flowchart for explaining details of the one-line write processing in the page spool buffer 1301 based on the generated span list 1000 in step S1509 in FIG. 19B.

In step S2001, the RIP 111 resets the value of a variable CurrentX to zero. In step S2002, the RIP 111 reads the first entry of the span list 1000.

The RIP 111 acquires the span start point X-coordinate value 1001 in step S2003, and calculates SpanLength=X−CurrentX for a variable SpanLength, thus updating SpanLength.

The RIP 111 confirms in step S2005 if the edge identifier 1002 is I (image). If the edge identifier 1002 is other than I (image), the RIP 111 confirms in step S2006 if SpanLength is a value larger than 0.

If SpanLength is equal to or larger than 1, the span includes pixels to be drawn. In step S2007, the RIP 111 overwrites the image area flag by the value of the edge identifier 1002 with respect to a pixel at the corresponding coordinate position in the page spool buffer 1301. Furthermore, the RIP 111 searches the level list 700 using the value of the level number 1003 in step S2008. In step. S2009, the RIP 111 acquires "r.g.b" values from an entry in the fill table 430 referred to by the fill address 702 having the same level number 701, and overwrites the color values of the pixel in the page spool buffer 1301 by the acquired values. Furthermore, the RIP 111 decrements the SpanLength value in step S2010 to process the right neighboring pixel.

If SpanLength is equal to or smaller than 0, it indicates that the drawing processing of all pixels in the span is complete, and the RIP 111 overwrites the variable CurrentX by the span start point X-coordinate value 1001 in step S2011. The process then advances to step S2020.

If it is determined in step S2005 that the edge identifier 1002 is I (image), the RIP 111 confirms in step S2012 if SpanLength is a value larger than 0.

If SpanLength is equal to or larger than 1, it indicates that the span includes pixels to be drawn. In step S2013, the RIP 111 overwrites the image area flag by the value of the edge identifier 1002 with respect to a pixel at the corresponding coordinate position in the page spool buffer 1301. Furthermore, the RIP 111 searches the level list 700 using the value of the level number 1003 in step S2014. The RIP 111 acquires an address of the decompression image buffer 420 from an entry in the fill table 430 referred to by the fill address 702 having the same level number 701 in step S2015. In step S2016, the RIP 111 refers to a corresponding source image pixel in the decompression image buffer 420 using the current scan-line Y-coordinate value and CurrentX value to acquire "r.g.b" values. In step S2017, the RIP 111 overwrites the color values of a pixel in the page spool buffer 1301 by the acquired "r.g.b" values. Furthermore, the RIP 111 decrements the SpanLength value in step S2018 to process the right neighboring pixel. The RIP 111 increments the variable CurrentX in step S2019. After that, the process returns to step S2012.

If SpanLength is equal to or smaller than 0 in step S2012, it indicates that the drawing processing of all pixels in the span is complete, and the RIP 111 advances the process to step S2020.

In step S2020, the RIP 111 confirms the next entry of the span list 1000. If the entry includes valid values in step S2021, the RIP 111 determines that the next span is required to be drawn, and the process returns to step S2003. If there is no next span, in step S2022, the RIP 111 fills white in the remaining pixels in the identical scan-line by setting their r.g.b values to be maximum values, thus ending the processing. The control then returns to the previous routine.

<Processing Sequence Example of Low-Resolution Rendering S1406 by RIP 111>

Figure 23A:
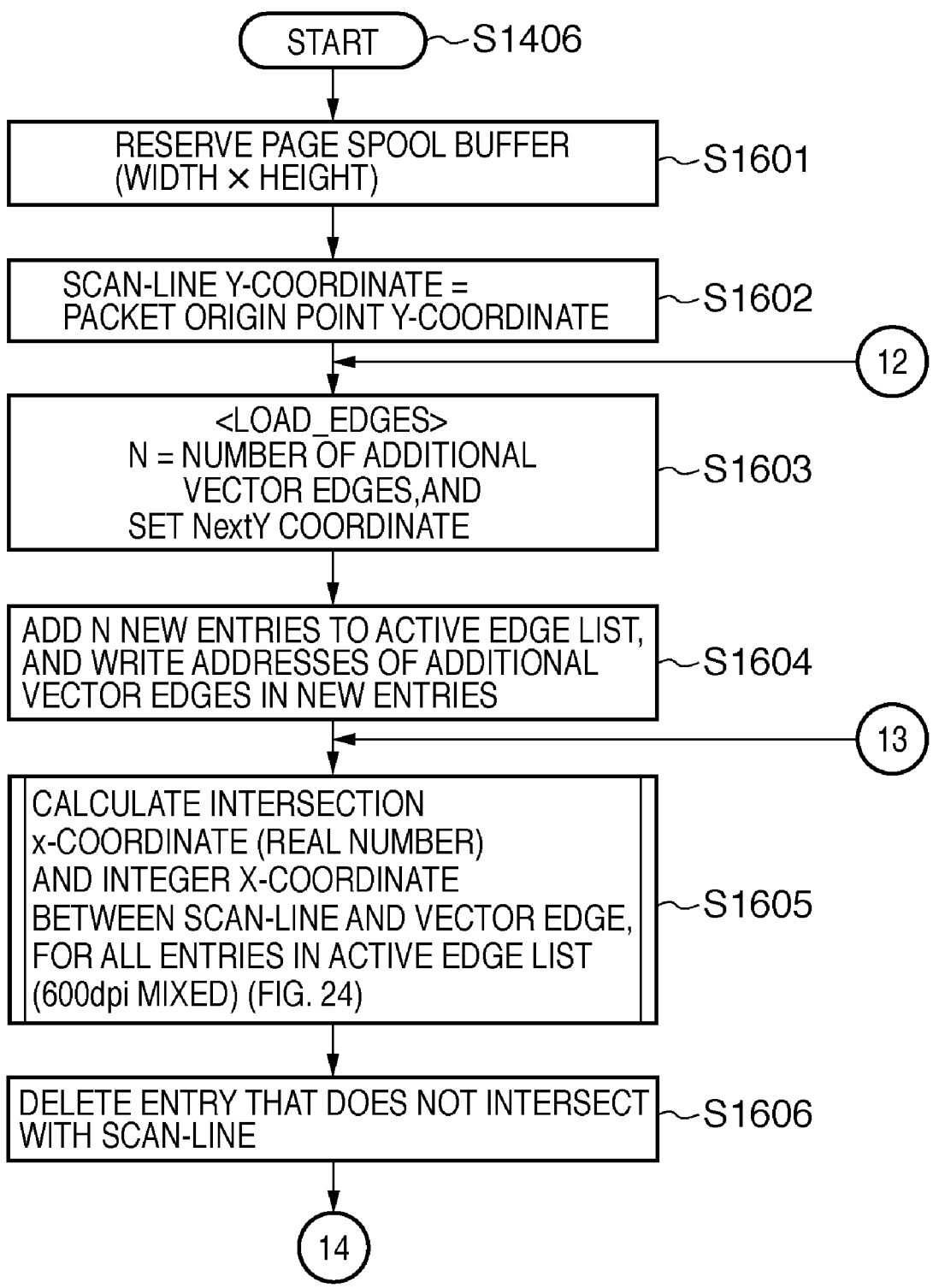
FIGS. 23A and 23B are flowcharts showing an example of the sequence of detailed processing in step S1406 in FIG. 18.
Figure 23B:
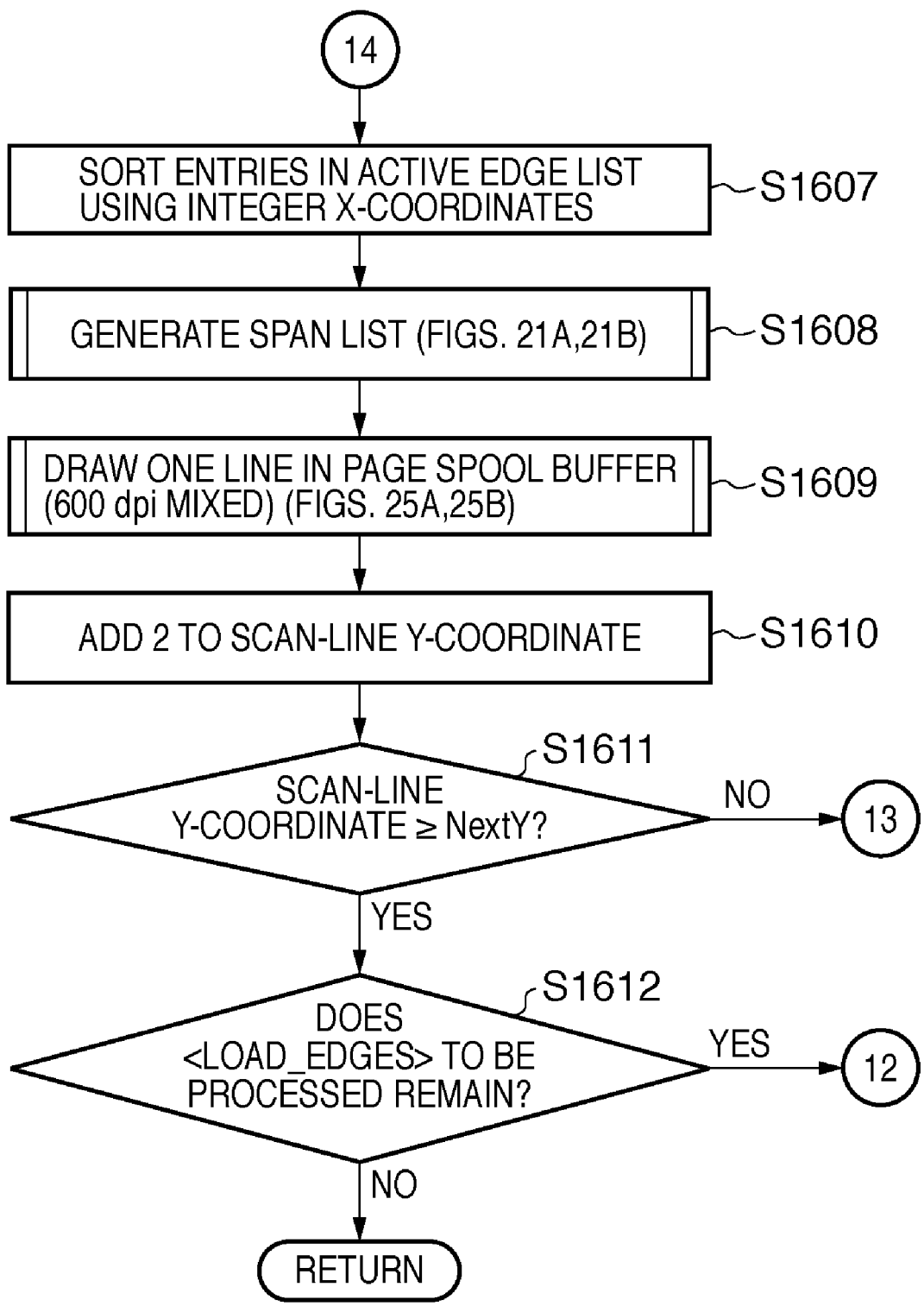

FIGS. 23A and 23B are flowcharts showing an example of the sequence of details of the drawing processing that sets only a low resolution as the resolution quality of the RIP 111 in step S1406 in FIG. 18.

Note that differences in the processes in FIGS. 23A and 23B from FIGS. 19A and 19B are intersection calculation processing in step S1605, one-line drawing processing in step S1609, Y-coordinate update processing in step S1610, and Y-coordinate comparison processing in step S1611. These differences arise from the different processing resolution qualities.

In step S1405 of FIG. 18 shown in FIGS. 19A and 19B, the RIP 111 executes processing to all pixel positions to attain drawing to have the 1200- or 600-dpi quality. By contrast, in step S1406 of FIG. 18 shown in FIGS. 23A and 23B, the RIP 111 executes processing to only pixel positions where X- and Y-coordinates assume even number values (it adds 2 to X- and Y-coordinates) so as to attain drawing to have the 600-dpi quality, unlike in step S1405 of FIG. 1.

That is, in the processing in step S1610, the RIP 111 adds 2 to the scan-line Y-coordinate. In the processing in step S1611, upon comparing the scan-line Y-coordinate value with the variable NextY, since the Y-coordinate value often exceeds the variable NextY, an inequality is used.

Since details of the processing in step S1605 will be described later using FIG. 24, and details of the processing in step S1609 will be described later using FIGS. 25A and 25B, a repetitive description of other steps in FIGS. 23A and 23B will be avoided. Note that the span list generation processing in step S1608 has already been described above with reference to FIGS. 21A and 21B.

(Sequence Example of Intersection Calculation S1605 Between Scan-Line and Vector Edge)

Figure 24:
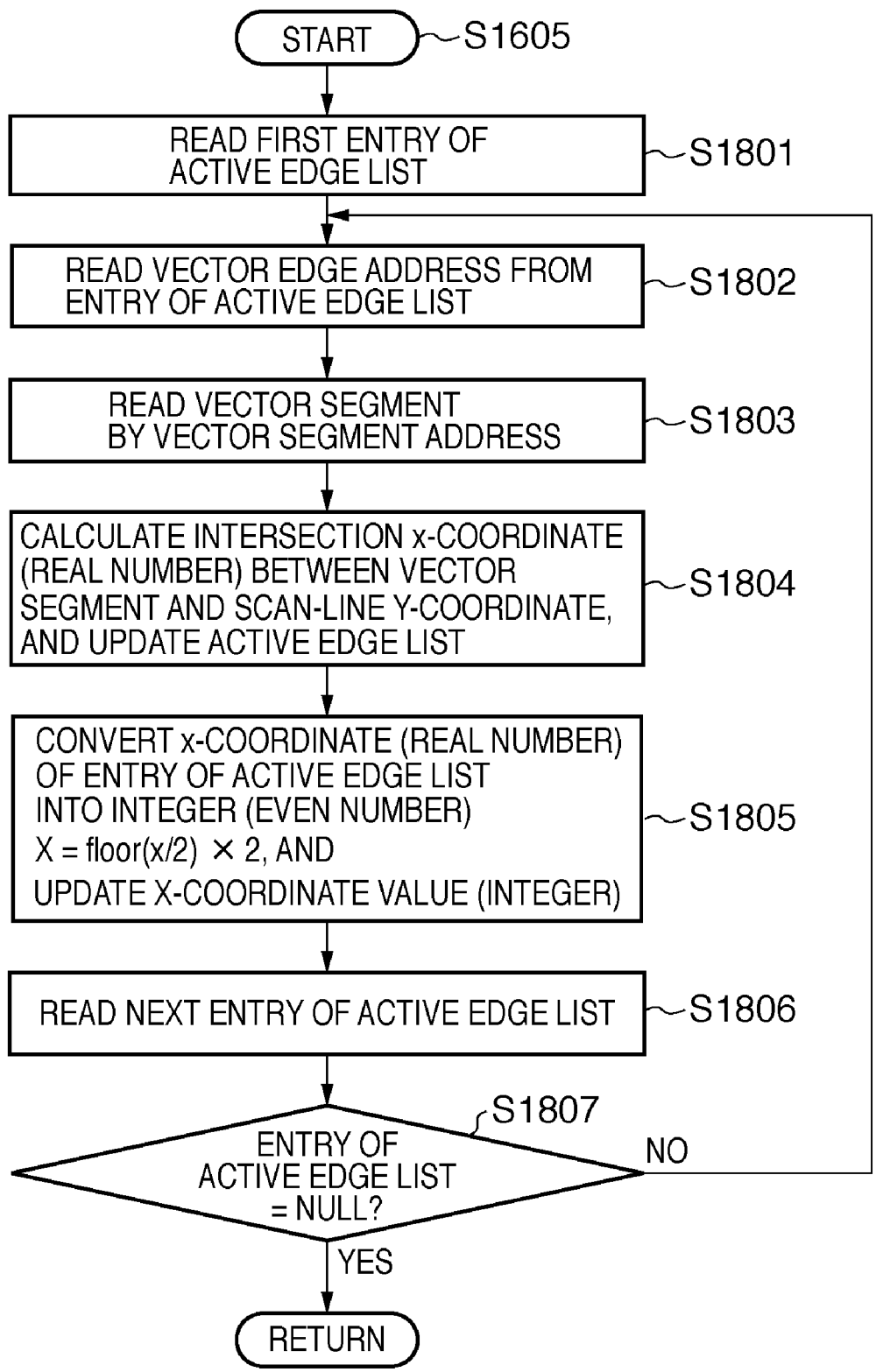
FIG. 24 is a flowchart showing an example of the sequence of detailed processing in step S1605 in FIG. 23A.

FIG. 24 is a flowchart showing details of the calculation processing of the intersections between the scan-line and vector edges when the resolution quality is only a low resolution in step S1605 in FIG. 23A.

The differences between FIG. 24 and FIGS. 20A, 20B described above arise from the different processing resolution qualities. In FIGS. 20A and 20B, the RIP 111 executes processing to all pixel positions upon processing of the S and L edges, so as to attain drawing to have the 1200- or 600-dpi quality. By contrast, in FIG. 24, the RIP 111 executes processing to only pixel positions where X- and Y-coordinates assume even number values, so as to attain drawing to have the 600-dpi quality, unlike in FIGS. 20A and 20B.

That is, steps S1801 to S1807 in FIG. 24 correspond to the processes in steps S1701, S1702 and S1709 to S1711 in FIG. 20A, and S1712 and S1713 in FIG. 20B. Therefore, a repetitive description of respective steps in FIG. 24 will be avoided.

The views for explaining the concept of the conversion processing into an integer coordinate value of the processes described above are FIGS. 11 and 12 above. To restate, FIG. 11 shows the concept of a state in which the 1200-dpi quality is attained in a one-pixel unit for S and L edges, and the 600-dpi quality is attained in a plural-pixel unit for other edges in the sequences of processing shown in FIGS. 19A, 19B, 20A and 20B. On the other hand, FIG. 12 shows the concept of a state in which the 600-dpi quality is attained in a plural-pixel unit in processing of a packet DL which includes neither an S edge nor an L edge in the sequences of processing shown in FIGS. 23A, 23B and 24.

(Sequence Example of One-Line Write S1609 to Page Spool Buffer)

Figure 25A:
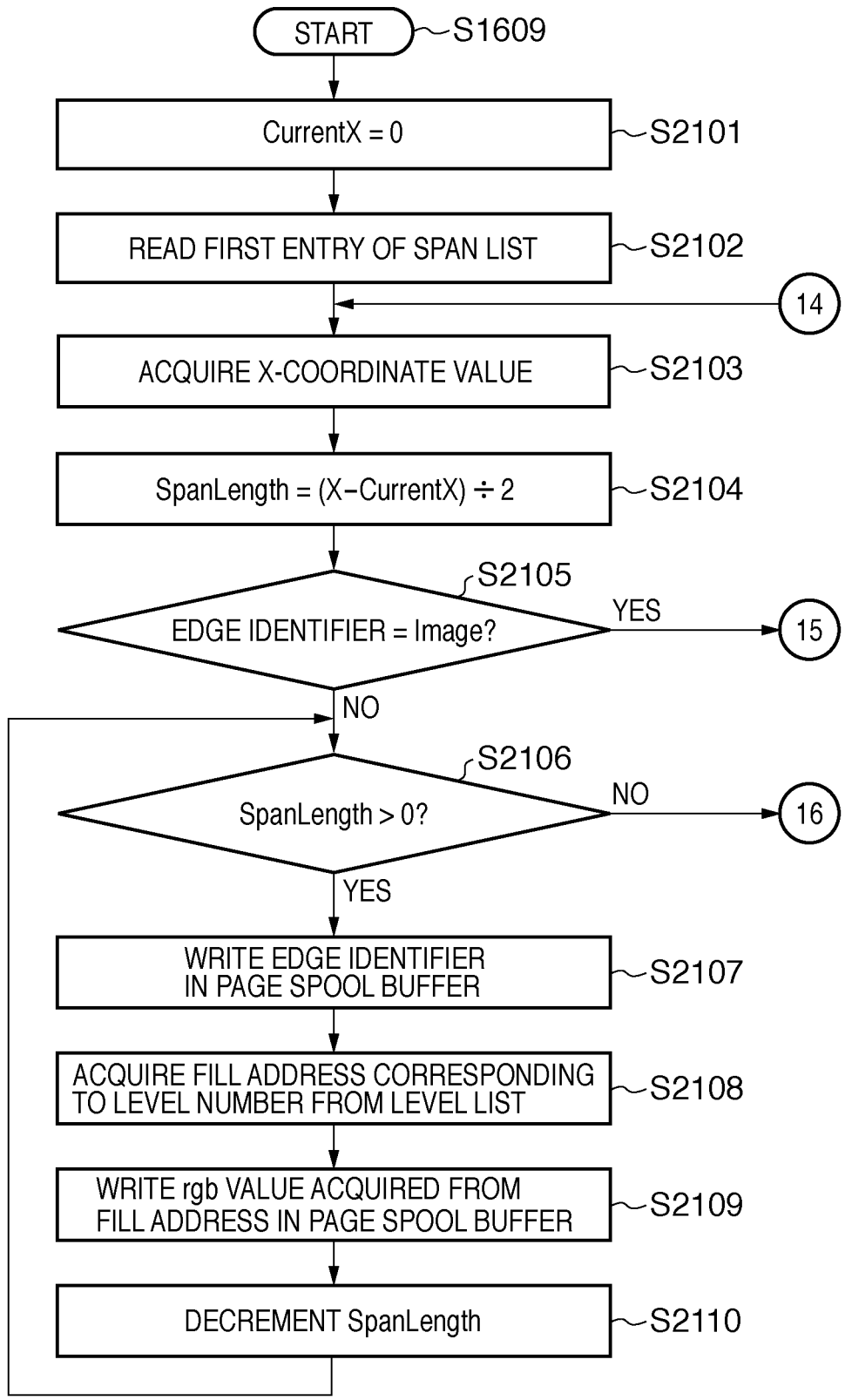
FIGS. 25A and 25B are flowcharts showing an example of the sequence of detailed processing in step S1609 in FIG. 23B.
Figure 25B:
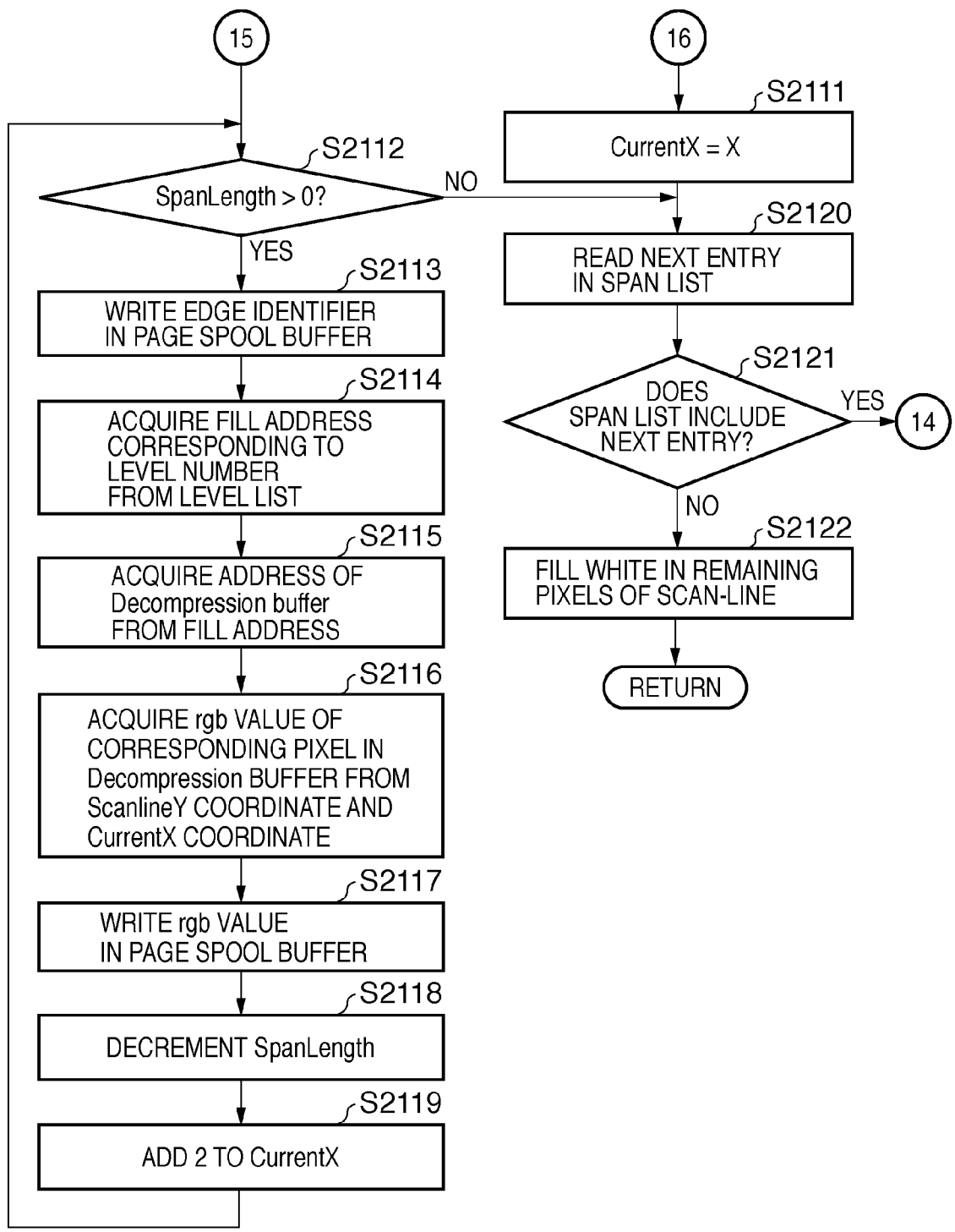

FIGS. 25A and 25B are flowcharts for explaining details of one-line write processing to the page spool buffer 1301 when the resolution quality is only a low resolution in step S1609 in FIG. 23S.

The differences between FIGS. 25A, 25B and FIGS. 22A, 22B are only steps S2104 and S2119. These differences arise from the different processing resolution qualities. In FIGS. 22A and 22B, the RIP 111 executes processing to all pixel positions to attain drawing to have the 1200- or 600-dpi quality. By contrast, in FIGS. 25A and 25B, the RIP 111 executes processing to only pixel positions where X- and Y-coordinates assume even number values (it halves Span-Length and adds 2 to CurrentX) so as to attain drawing to have the 600-dpi quality, unlike in FIGS. 22A and 22B.

Therefore, a repetitive description of other steps will be avoided.

Note that, based on the above processing difference, FIGS. 13 and 14 above illustrate differences in pixel value acquisition processing of an image between step S2016 in FIG. 22B and step S2116 in FIG. 25B. That is, in FIG. 13, processing in a one-pixel unit is executed for all pixel positions to attain drawing to have the 1200-dpi quality, thus achieving a high resolution. On the other hand, in FIG. 14, processing in a plural-pixel unit is executed for only pixel positions where X- and Y-coordinates assume even number values, so as to attain drawing to have the 600-dpi quality, and enlarging pixel processing is executed to achieve a low resolution.

Other Embodiments

One embodiment has been described in detail. However, the processing according to the present invention is not limited to that to be executed by the RIP, but it may be executed by other processors, for example, the CPU 101 in FIG. 2. Furthermore, this embodiment has exemplified the digital MFP as an application example of the image processing apparatus of the present invention. However, the present invention is not limited to such specific apparatus. The present invention can be widely applied to techniques for reproducing the entire image for respective segmented areas, and can also be applied to image display. Furthermore, the present invention is also widely applicable to word-processing (word-processor) software, spreadsheet software, drawing software, and the like. They are also included in the present invention.

The present invention may be applied to either a system constituted by a plurality of devices, or an apparatus consisting of a single device. For example, the present invention may be applied to a scanner, printer, PC, copying machine, MFP, and facsimile apparatus.

The present invention can also be achieved when a program of software that implements the functions of the aforementioned embodiments is directly or remotely supplied to a system or apparatus. Then, a computer included in that system or the like reads out and executes the supplied program code.

Therefore, the program code itself installed in a computer to implement the functions and processing of the present invention using the computer implements the present invention. That is, the present invention includes the computer program itself for implementing the functions and processing of the present invention.

In this case, the form of program is not particularly limited, and an object code, a program to be executed by an interpreter, script data to be supplied to an OS, and the like may be used as long as they have the program function. As a recording medium for supplying the program, for example, a flexible disk, hard disk, optical disk, magneto-optical disk, MO, CD-ROM, CD-R, and CD-RW may be used. Also, as the recording medium, a magnetic tape, nonvolatile memory card, ROM, DVD (DVD-ROM, DVD-R), and the like may be used.

The program may also be downloaded from a Web site on the Internet/Intranet using a browser running on a client computer. That is, the computer program itself of the present invention or a compressed file including an automatic installation function may be downloaded from the Web site onto a recording medium such as a hard disk. The program code which forms the program of the present invention may be segmented into a plurality of files, and the respective files may be downloaded from different Web sites. That is, a WWW server which makes a plurality of users download the program file for implementing the functions and processing of the present invention using computers may also become a building component of the present invention.

A storage medium such as a CD-ROM, which stores the encrypted program of the present invention may be distributed to users. In this case, only a user who meets predetermined conditions is allowed to download key information used to decrypt the encrypted program from a Web site via the Internet/Intranet. The user may decrypt the encrypted program using that key information, and install the program in the computer by executing the decrypted program.

The functions of the aforementioned embodiments may be implemented by executing the readout program by the computer. Note that an OS or the like running on the computer may execute some or all of actual processes based on an instruction of that program. Of course, in such a case as well, the functions of the aforementioned embodiments can be implemented.

Furthermore, the program read out from the recording medium may be written in a memory equipped in a function expansion board or unit, which is inserted into or connected to the computer. Based on an instruction of that program, a CPU or the like equipped in the function expansion board or unit may execute some or all of actual processes. In this way, the functions of the aforementioned embodiments may be implemented.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-128794, filed May 15, 2008, which is hereby incorporated by reference herein in its entirety.

What is claimed is:

1. An image processing apparatus comprising:
a drawing control unit adapted to handle a page of drawing data as a set of pieces of drawing data, the set of pieces of drawing data corresponding to a plurality of areas into which a page of image is segmented; and
a rendering unit adapted to render drawing data of each segmented area,
wherein the drawing control unit holds information used to determine a rendering resolution in association with a drawing object in each segmented area, and
the rendering unit determines, based on the information, that the rendering resolution of a segmented area of the plurality of areas which includes a first drawing object is a first resolution and the rendering resolution of a segmented area of the plurality of areas which does not include the first drawing object is a second resolution which is lower than the first resolution, and renders the drawing data in the each segmented area with the determined rendering resolution,
wherein, when the drawing data of the segmented area which includes the first drawing object is rendered, a position of an edge of the first drawing object is determined by drawing in a one-pixel unit and a position of an edge of another drawing object other than the first drawing object in the drawing data of the segmented area is determined by drawing in a plural-pixel unit.

2. The apparatus according to claim 1, wherein the information used to determine the resolution is information indicating a type of drawing object, and the rendering unit renders a drawing object of a specific type so as to have the first resolution, and renders a drawing object other than the specific type so as to seem to have the second resolution.

3. The apparatus according to claim 2, wherein the drawing object of the specific type includes a small letter object and a thin line object.

4. The apparatus according to claim 2, wherein when image data configured in a bitmap form is used as source image data for drawing an image, the rendering unit renders an object(s) other than the drawing object of the specific type by acquiring pixel values in a plural-pixel unit by coordinate values of the source image data.

5. The apparatus according to claim 2, wherein the rendering unit holds rendering results and information associated with the rendering resolutions for respective segmented areas, and the drawing control unit, when transferring the held rendering results to a page memory, transfers the rendering result in an area in which the information indicating the first resolution is held to the page memory with the first resolution, and transfers the rendering result in an area in which the information indicating the second resolution is held to the page memory with applying an enlarging pixel process to the rendering result.

6. The apparatus according to claim 1, wherein the rendering unit renders for each scan-line in the segmented area.

7. A method of controlling an image processing apparatus, comprising:

a drawing control step of handling, by the image processing apparatus, a page of drawing data as a set of pieces of drawing data, the set of pieces of drawing data corresponding to a plurality of areas into which a page of image is segmented; and a rendering step of rendering, by the image processing apparatus, drawing data of each segmented area, wherein in the drawing control step, information used to determine a rendering resolution is held in association with a drawing object in each segmented area, and in the rendering step, based on the information, that the rendering resolution of a segmented area of the plurality of areas which includes a first drawing object is a first resolution and the rendering resolution of a segmented area of the plurality of areas which does not include the first drawing object is a second resolution which is lower than the first resolution, and renders the drawing data in the each segmented area with the determined rendering resolution, wherein, when the drawing data of the segmented area which includes the first drawing object is rendered, a position of an edge of the first drawing object is determined by drawing in a one-pixel unit and a position of an edge of another drawing object other than the first drawing object in the drawing data of the segmented area is determined by drawing in a plural-pixel unit.

8. The method according to claim 7, wherein the information used to determine the resolution is information indicating a type of drawing object, and in the rendering step, a drawing object of a specific type is rendered so as to have the first resolution, and a drawing object other than the specific type is rendered so as to seem to have the second resolution.

9. The method according to claim 8, wherein the drawing object of the specific type includes a small letter object and a thin line object.

10. The method according to claim 8, wherein when image data configured in a bitmap form is used as source image data for drawing an image, an object(s) other than the drawing object of the specific type is rendered in the rendering step by acquiring pixel values in a plural-pixel unit by coordinate values of the source image data.

11. The method according to claim 8, wherein in the rendering step, rendering results and information associated with the rendering resolutions are held for respective segmented areas, and in the drawing control step, when transferring the held rendering results to a page memory, the rendering result in an area in which the information indicating the first resolution is held is transferred to the page memory with the first resolution, and the rendering result in an area in which the information indicating the second resolution is held is transferred to the page memory with applying an enlarging pixel process to the rendering result.

12. The method according to claim 7, wherein in the rendering step, rendering is executed for each scan-line of the segmented area.

13. A non-transitory computer-readable medium storing a program for making a computer execute steps of a method of controlling an image processing apparatus according to claim 7.

14. An image processing method for handling a page of drawing data as a set of pieces of drawing data each provided by segmenting a page of image into a plurality of areas, comprising the steps of:

holding information representing a type of drawing object in association with a drawing object in each segmented area; and rendering, in each segmented area, a drawing object of a specific type with a first resolution and a drawing object other than the drawing object of the specific type with a second resolution which is lower than the first resolution, wherein, when the drawing data of the segmented area which includes the drawing object of the specific type is rendered, a position of an edge of the drawing object of the specific type is determined by drawing in a one-pixel unit and a position of an edge of another drawing object other than the drawing object of the specific type is determined by drawing in a plural-pixel unit.

* * * * *